(12) United States Patent
Tabatabai et al.

(10) Patent No.: US 10,708,608 B2
(45) Date of Patent: *Jul. 7, 2020

(54) LAYER BASED HRD BUFFER MANAGEMENT FOR SCALABLE HEVC

(71) Applicant: SONY CORPORATION, Tokyo (JP)

(72) Inventors: Ali Tabatabai, Cupertino, CA (US); Kazushi Sato, Kanagawa (JP); Shinobu Hattori, Tokyo (JP); Teruhiko Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/396,146

(22) Filed: Apr. 26, 2019

(65) Prior Publication Data

US 2019/0253726 A1   Aug. 15, 2019

Related U.S. Application Data

(63) Continuation of application No. 14/331,634, filed on Jul. 15, 2014, now abandoned.

(60) Provisional application No. 61/889,980, filed on Oct. 11, 2013, provisional application No. 61/846,552, filed on Jul. 15, 2013.

(51) Int. Cl.
*H04N 19/423* (2014.01)
*H04N 19/44* (2014.01)
*H04N 19/70* (2014.01)
*H04N 19/30* (2014.01)

(52) U.S. Cl.
CPC ........... *H04N 19/423* (2014.11); *H04N 19/30* (2014.11); *H04N 19/44* (2014.11); *H04N 19/70* (2014.11)

(58) Field of Classification Search
CPC ...... H04N 19/423; H04N 19/30; H04N 19/70; H04N 19/44
USPC ..................................................... 375/240.26
See application file for complete search history.

(56) References Cited

U.S. PATENT DOCUMENTS

| | | |
|---|---|---|
| 2003/0179825 A1 | 9/2003 | Sekiguchi et al. |
| 2004/0081198 A1 | 4/2004 | Gardner et al. |
| 2005/0254575 A1 | 11/2005 | Hannuksela et al. |
| 2007/0086521 A1 | 4/2007 | Wang et al. |
| 2007/0153914 A1 | 7/2007 | Hannuksela et al. |
| 2007/0183494 A1 | 8/2007 | Hannuksela |
| 2007/0230564 A1 | 10/2007 | Chen et al. |

(Continued)

FOREIGN PATENT DOCUMENTS

WO   2013/113134 A1   8/2013

OTHER PUBLICATIONS

Notice of Allowance and Fees Due for U.S. Appl. No. 14/331,634, dated Jan. 28, 2019, 15 pages.

(Continued)

*Primary Examiner* — Zaihan Jiang
(74) *Attorney, Agent, or Firm* — Chip Law Group

(57) ABSTRACT

The buffer management methods simplify the complexity of STD buffer management for HEVC and make is easy to implement HEVC in deployed AVC/MPEG-2 networks (as legacy re-multiplexers are able to be used for re-purposing HEVC content). The buffers for base and enhancement layers are also be managed independently before re-assembly and this simplifies the STD model. Re-assembly is still implemented before decoding an enhanced HEVC video stream.

12 Claims, 8 Drawing Sheets

(56) References Cited

U.S. PATENT DOCUMENTS

| | | | |
|---|---|---|---|
| 2009/0225870 A1* | 9/2009 | Narasimhan | H04N 7/52 375/240.26 |
| 2010/0046622 A1 | 2/2010 | Doser et al. | |
| 2010/0091837 A1 | 4/2010 | Zhu et al. | |
| 2010/0157016 A1 | 6/2010 | Sylvain | |
| 2012/0269275 A1 | 10/2012 | Hannuksela | |
| 2013/0033642 A1 | 2/2013 | Wan et al. | |
| 2013/0128990 A1 | 5/2013 | Narasimhan | |
| 2013/0170561 A1 | 7/2013 | Hannuksela | |
| 2014/0092994 A1* | 4/2014 | Wang | H04N 19/70 375/240.26 |
| 2014/0269937 A1 | 9/2014 | Wadsworth et al. | |
| 2014/0301477 A1 | 10/2014 | Deshpande | |
| 2014/0301482 A1* | 10/2014 | Narasimhan | H04N 19/70 375/240.26 |
| 2014/0355692 A1 | 12/2014 | Ramasubramonian et al. | |
| 2015/0341644 A1 | 11/2015 | Narasimhan et al. | |
| 2015/0341649 A1 | 11/2015 | Narasimhan et al. | |
| 2018/0103272 A1 | 4/2018 | Narasimhan | |

OTHER PUBLICATIONS

Advisory Action for U.S. Appl. No. 14/331,634, dated Sep. 13, 2018, 02 pages.

Final Rejection for U.S. Appl. No. 14/331,634, dated Jun. 28, 2018, 17 pages.

Non-Final Rejection for U.S. Appl. No. 14/331,634, dated Nov. 30, 2017, 20 pages.

Advisory Action for U.S. Appl. No. 14/331,634, dated Aug. 21, 2017, 04 pages.

Final Rejection for U.S. Appl. No. 14/331,634, dated Jun. 5, 2017, 12 pages.

Non-Final Rejection for U.S. Appl. No. 14/331,634, dated Dec. 14, 2016, 10 pages.

\* cited by examiner

LAYER BASED HRD BUFFER MANAGEMENT FOR SCALABLE HEVC

CROSS-REFERENCE TO RELATED APPLICATION(S)

The application is a continuation of U.S. patent application Ser. No. 14/331,634 filed on Jul. 15, 2014, which claims the benefit of priority from U.S. Provisional Patent Application Ser. No. 61/846,552 filed on Jul. 15, 2013 and from U.S. Provisional Patent Application Ser. No. 61/889,980 filed on Oct. 11, 2013. Each of the above-referenced applications is hereby incorporated herein by reference in its entirety.

FIELD OF THE INVENTION

The present invention relates to the field of imaging. More specifically, the present invention relates to video coding.

BACKGROUND OF THE INVENTION

The buffer management in Advanced Video Coding (AVC)-based scalability (Scalable Video Coding (SVC) and Multiview Video Coding (MVC)) required an extension to system STD buffer model and introduced an additional layer of complexity to re-purposing and re-distribution equipment. The extensions required management of both the base layer buffer and buffer with base and enhancement layer/layers at the same time in both transmission and decoding equipment.

SUMMARY OF THE INVENTION

The buffer management methods simplify the complexity of STD buffer management for HEVC and make is easy to implement HEVC in deployed AVC/MPEG-2 networks (as legacy re-multiplexers are able to be used for re-purposing HEVC content). The buffers for base and enhancement layers are also also be managed independently before re-assembly and this simplifies the STD model. Re-assembly is still implemented before decoding an enhanced HEVC video stream.

In one aspect, a method programmed in a non-transitory memory of a device comprises acquiring a video and transmitting a bitstream of the video including signaling a maximum bit rate, average bit rate and maximum coded picture buffer size allocated for each layer in the bitstream. The method further comprises implementing an extension and parameters that are configured to be defined as whole-sequence level or sub-stream level. The method further comprises managing a system buffer for each layer independently without having to re-assemble lower layers. The method further comprises managing buffers for base and enhancement layers of the video before re-assembly. The method further comprises implementing a multilayer decoder. The method further comprises associating buffering period and picture timing supplemental enhancement information messages with each layer of the video. The method further comprises utilizing a same picture timing supplemental enhancement information message for all layers of the video for synchronization of removal times within a layer set, and utilizing different buffering period supplemental enhancement information messages for each layer of the video. The device is selected from the group consisting of a personal computer, a laptop computer, a computer workstation, a server, a mainframe computer, a handheld computer, a personal digital assistant, a cellular/mobile telephone, a smart phone, a smart appliance, a gaming console, a digital camera, a digital camcorder, a camera phone, an portable music player, a tablet computer, a video player, a DVD writer/player, a high definition video writer/player, a television and a home entertainment system.

In another aspect, a system programmed in a non-transitory memory of a camera device comprises a sensor configured for acquiring a video and a transmitting component configured for transmitting a bitstream of the video including signaling a maximum bit rate, average bit rate and maximum coded picture buffer size allocated for each layer in the bitstream. The transmitting component is further configured for implementing an extension and parameters that are configured to be defined as whole-sequence level or sub-stream level. The transmitting component is further configured for managing a system buffer for each layer independently without having to re-assemble lower layers. The transmitting component is further configured for managing buffers for base and enhancement layers of the video before re-assembly. The transmitting component is further configured for implementing a multilayer decoder. The transmitting component is further configured for associating buffering period and picture timing supplemental enhancement information messages with each layer of the video. The transmitting component is further configured for utilizing a same picture timing supplemental enhancement information message for all layers of the video for synchronization of removal times within a layer set, and utilizing different buffering period supplemental enhancement information messages for each layer of the video.

In another aspect, an apparatus comprises a sensor configured for acquiring a video, a non-transitory memory for storing an application, the application for: transmitting a bitstream of the video including signaling a maximum bit rate, average bit rate and maximum coded picture buffer size allocated for each layer in the bitstream and a processing component coupled to the memory, the processing component configured for processing the application. The application is further configured for implementing an extension and parameters that are configured to be defined as whole-sequence level or sub-stream level. The application is further configured for managing a system buffer for each layer independently without having to re-assemble lower layers. The application is further configured for managing buffers for base and enhancement layers of the video before re-assembly. The application is further configured for implementing a multilayer decoder. The application is further configured for associating buffering period and picture timing supplemental enhancement information messages with each layer of the video. The application is further configured for utilizing a same picture timing supplemental enhancement information message for all layers of the video for synchronization of removal times within a layer set, and utilizing different buffering period supplemental enhancement information messages for each layer of the video.

DETAILED DESCRIPTION OF THE PREFERRED EMBODIMENT

Described herein are options to reduce the buffer model complexity in High Efficiency Video Coding (HEVC)-based scalability.

The scalability model as introduced in SVC (and also used in MVC) uses AVC base layer and adds scalable enhancements to achieve temporal, Signal-to-Noise Ratio (SNR) and spatial improvements. Typical SVC applications targeted use cases where bit rate savings were achieved over simulcast of 'base layer and enhancement without scalability.' MVC provided view enhancements using a similar model.

Some of the application use cases required transmission of AVC base layer stream to base layer decoder while the enhancement layer was transmitted separately where the SVC/MVC decoder assembled the base and enhancement layers before decoding the enhanced data.

Figure 1:
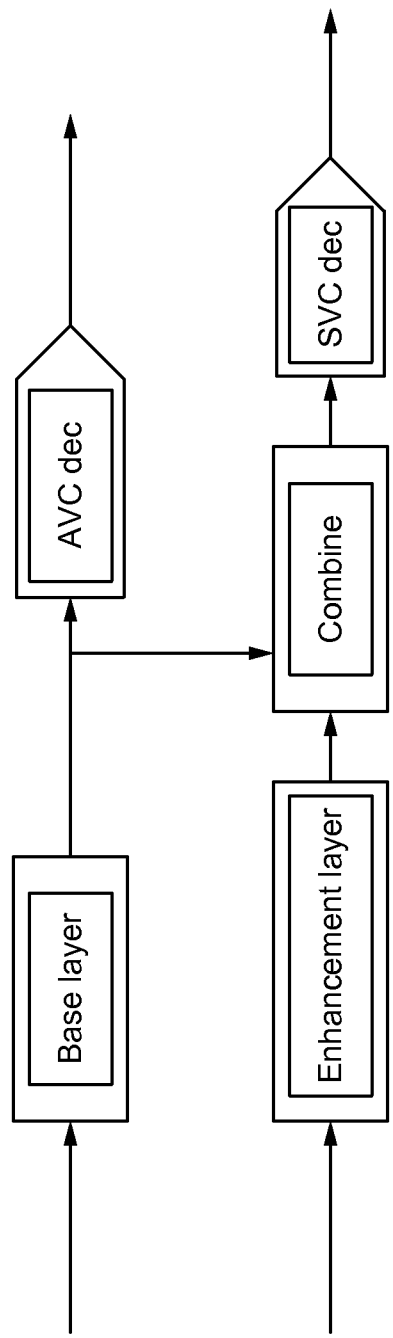
FIG. 1 illustrates a diagram of AVC and SVC decoding according to some embodiments.

FIG. 1 illustrates a diagram of AVC and SVC decoding according to some embodiments. The base layer video stream used a different profile and level than the [base+enhancement layer] (usually the enhancement layer being higher level than base layer), and each used a different Coded Picture Buffer (CPB) size and bit rate for Hypothetical Reference Decoder (HRD) buffer management. The video standard (and in turn systems) did not specify an independent buffer size and rate for each enhancement layer and the specification defined a scheme where the base layer and [base+enhancement layer] buffers were managed in parallel to make sure they did not overflow or underflow. This management was required at both the encoding end as well as decoders. The HRD model for SVC and MVC did not address such parallel CPB management of base layer and [base+enhancement layer]. The HRD model defined how to extract base layer video from the full SVC/MVC access unit and then manage the base layer.

The transport part of SVC/MVC had to support the STD management independently for base and [base+enhancement layer] as STD does not have the ability to extract base layer data from full SVC access units and this capability would have required the base layer decoders to support the larger buffer sizes that included the base and enhancement layer data. The STD extension in systems requires a virtual re-assembly buffer and the management of multiple buffers after re-assembly. This has made the STD more complex for SVC and MVC transport and makes re-multiplexing very difficult, complex and not implementable with legacy re-multiplexers. The defined compression of enhancement layer required variable bit rate and buffer allocation between base layer and enhancement layer to achieve best results. For example, if it was required to use a higher buffer size and rates for base layer, the equivalent was adjusted in enhancement layer and vice versa. However, the buffer size and rates for base layer or [base+enhancement] layer could not exceed the maximum limits for the level specified.

Figure 2:
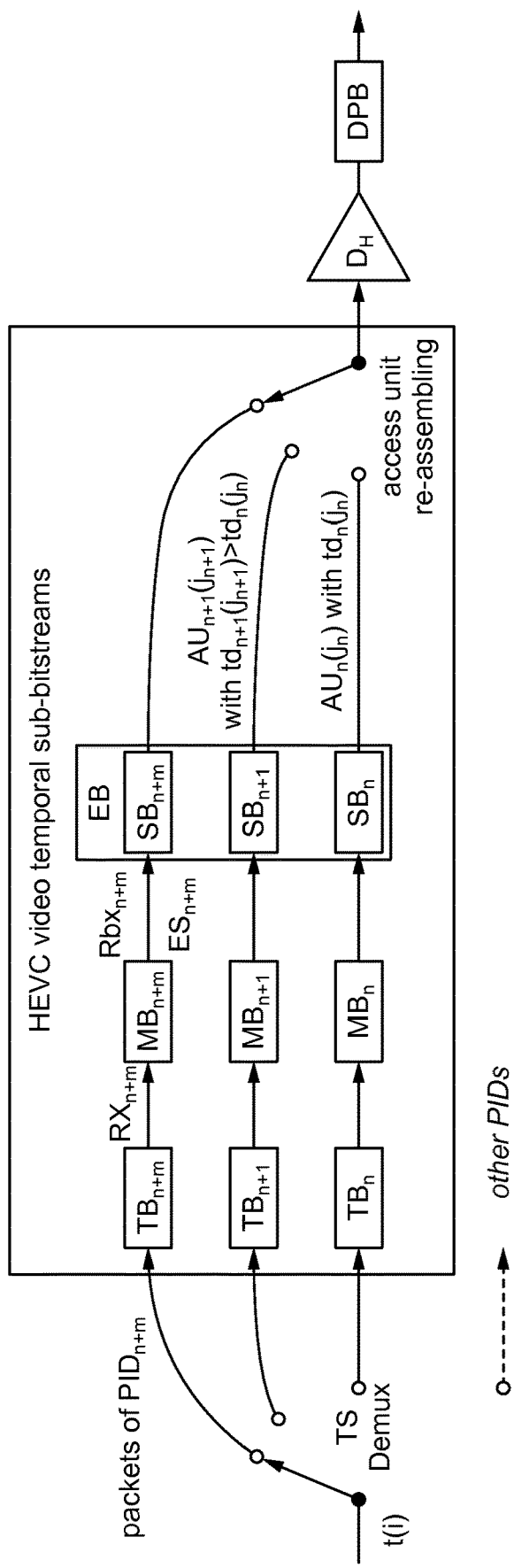
FIG. 2 illustrates an example of the system buffer model for HEVC layered coding and this is the same as that specified for SVC and MVC.

FIG. 2 illustrates an example of the system buffer model for HEVC layered coding and this is the same as that specified for SVC and MVC.

Simplify Buffer Management Issues in HEVC Scalability

HEVC scalability includes additional use cases than just 'simulcast' and is more efficient in compression of enhancement layers. In all of these cases, it will be difficult to manage base layer and [base+enhancement layer] buffers in parallel to achieve conforming system buffer behavior if HEVC scalability adopts a similar HRD buffer model as AVC scalability. The schemes described herein simplify system buffer management where the parallel buffer management is able to be avoided by use of a new SEI and an extension to HRD parameters.

HEVC_scalability SEI: The proposed SEI (based on SVC scalability info SEI or MVC view_scalability SEI) signals the maximum bit rate, average bit rate and maximum CPB buffer size allocated for each of the layers in the video stream. This is also be mapped into the system layer using a descriptor and allows implementation of independent single buffer STD model in systems as well as HRD for base and enhancement layers.

HRD extensions: Currently, HEVC HRD parameters are able to be defined either as whole-sequence level or sub-stream level. There might be the cases where system buffer is able to be managed for each layer/view independently without having to re-assemble the lower layer/views, but the current HRD specification does not support such scenario. Described herein uses the scalable HEVC extension in vps_extension( ) and sps_extension( ) to convey HRD parameters for a single-layer model or multi-layer model (like SVC or MVC) or both.

The methods simplify the complexity of STD buffer management for HEVC and make it easy to implement HEVC in deployed AVC/MPEG-2 networks (as legacy re-multiplexers are able to be used for re-purposing HEVC content). The buffers for base and enhancement layers are also able to be managed independently before re-assembly, and this simplifies the STD model. Re-assembly is still implemented before decoding an enhanced HEVC video stream.

HEVC Scalability SEI

A new suffix SEI to HEVC to signal layer specific is utilized information such as maximum bit rate, average bit rate and maximum CPB buffer size. The following table provides an example of the SEI message syntax where the parameters are able to be signaled for a single layer (vps_max_layers_minus1=0) or multiple layers.

Table 1 shows HEVC scalability information SEI message syntax.

| HEVC_scalability_info (payloadSize) { | Descriptor |
|---|---|
| active_vps_id | u(4) |
| for (i=0; i<= vps_num_layer_sets_minus1; i++) { | |
|   for(j=1; j<=vps_max_layer_id; j++) { | |
|     if(layer_id_included_flag[i][j]) { | |
|       layer_level_info_present_flag[i][j] | u(1) |
|       if(layer_level_present_flag[i][j]) | |
|         layer_level_idc[i][j] | u(8) |
|       layer_hrd_info_present_flag[i][j] | u(1) |
|       layer_sub_pic_hrd_info_present_flag[i][j] | u(1) |
|       if(layer_hrd_info_present_flag[i][j]){ | |
|         layer_bit_rate_value_minus1[i][j] | ue(v) |
|         layer_cpb_size_value_minus1[i][j] | ue(v) |
|       } | |
|       if(layer_sub_pic_hrd_info_present_flag[i][j]) { | |
|         layer_bit_rate_du_value_minus1[i][j] | ue(v) |
|         layer_cpb_size_du_value_minus1[i][j] | ue(v) |
|       } | |
|     } | |
|   } | |
| } | |
| } | | active_vps_id: identifies an active VPS that contains the layer information. The value of active_vpd_id shall be equal to the value of video_parameter_set_id of the active VPS for the VCL NAL units of the access unit containing the SEI message.

layer_level_info_present_flag[i][j]: specifies whether the level information about layer index j in layer set i is present.

layer_level_idc[i][j]: indicates a level to which jth layer in layer set i in the CVS conforms as specified.

layer_hrd_info_present_flag[i][j]: specifies whether the hrd information about layer indexj in layer set i is present.

layer_hrd_sub_picture_info_present_flag[i][j]: specifies whether the sub-picture hrd information about layer index j in layer set i is present.

layer_bit_rate_value_minus1[i][j]: (together with cpb_size_scale) specifies the maximum input bit rate of layer index j in layer set i.

layer_cpb_size_du_value_minus1[i][j]: (together with layer_cpb size_scale) specifies the CPB size of layer index j in layer set I CPB when CPB operates at sub-picture level.

Table 2 shows HEVC scalability information SEI message syntax.

| HEVC_scalability_info (payloadSize) { | Descriptor |
|---|---|
| active_vps_id | u(4) |
| layer_bit_rate_scale | u(4) |
| layer_cpb_size_scale | u(4) |
| for (i=0; i<= vps_num_layer_sets_minus1; i++) { | |
|   for(j=1; j<=vps_max_layer_id; j++) { | |
|     if(layer_id_included_flag[i][j]) { | |
|       layer_level_info_present_flag[i][j] | u(1) |
|       if(layer_level_present_flag[i][j]) | |
|         layer_level_idc[i][j] | u(8) |
|       layer_hrd_info_present_flag[i][j] | u(1) |
|       if(layer_hrd_info_present_flag[i][j]{ | |
|         layer_bit_rate_value_minus1[i][j] | ue(v) |
|         layer_cpb_size_value_minus1[i][j] | ue(v) |
|         layer_ave_bit_rate_value_minus1[i][j] | ue(v) |
|         layer_max_cpb_size_value_minus1[i][j] | ue(v) |
|         layer_bitrate_calc_window[i][j] | ue(v) |
|       } | |
|     } | |
|   } | |
| } | |
| } | | active_vps_id: identifies an active VPS that contains the layer information. The value of active_vps_id shall be equal to the value of video_parameter_set_id of the active VPS for the VCL NAL units of the access unit containing the SEI message.

layer_bit_rate_scale: has similar semantics to bit_rate_scale layer_cpb_size_scale: has similar semantics to cpb_size_scale layer_level_info_present_flag[i][j]: specifies whether the level information about layer index j in layer set i is present.

layer_level_idc[i][j]: indicates a level to which jth layer in layer set i in the CVS conforms as specified.

layer_hrd_info_presentflag[i][j]: specifies whether the hrd information about layer indexj in layer set i is present.

layer_bit_rate_value_minus1[i][j]: (together with layer_bit_rate_scale) specifies the maximum input bit rate of layer index j in layer set i. Has similar semantics as bit_rate_value_minus1.

layer_avg_bit_rate_value_minus1[i][j]: (together with layer_bit_rate_scale) specifies average value of layer index j in layer set i.

layer_max_cpb size_value_minus1[i][j]: (together with layer_cpb size_scale) specifies maximum cpb size value of layer index j in layer set i.

max_bitrate_calc_window[i][j]: specifies the window to calculate maximum bit rate of layer index j in layer set i.

Table 3 shows HEVC scalability information SEI message syntax.

Figure 3:
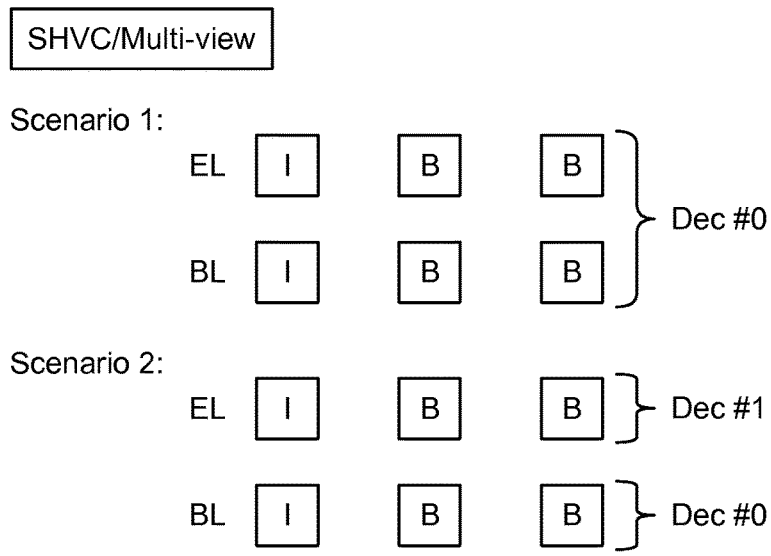
FIG. 3 illustrates a diagram of scenarios of decoders for SHVC/multi-view according to some embodiments.
Figure 4:
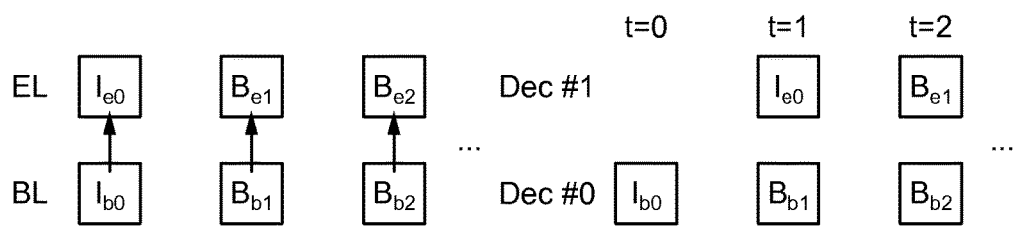
FIG. 4 illustrates a diagram of a 2-decoder model case according to some embodiments.

| | Descriptor |
|---|---|
| HEVC_scalability_info (payloadSize) { | |
| active_vps_id | u(4) |
| layer_bit_rate_scale | u(4) |
| layer_cpb_size_scale | u(4) |
| for (i=0; i<= vps_max_layer_id; i++) { | |
|   if(layer_id_included_flag[i]) { | |
|     layer_level_info_present_flag[i] | u(1) |
|     if(layer_level_present_flag[i]) | |
|       layer_level_idc[i] | u(8) |
|     layer_hrd_info_present_flag[i] | u(1) |
|     if(layer_hrd_info_present_flag[i]{ | |
|       layer_bit_rate_value_minus1[i] | ue(v) |
|       layer_cpb_size_value_minus1[i] | ue(v) |
|       layer_ave_bit_rate_value_minus1[i] | ue(v) |
|       layer_max_cpb_size_value_minus1[i] | ue(v) |
|       layer_bitrate_calc_window[i] | ue(v) |
|     } | |
|   } | |
| } | |
| } | | active_vps_id: identifies an active VPS that contains the layer information. The value of active_vps_id shall be equal to the value of video_parameter_set_id of the active VPS for the VCL NAL units of the access unit containing the SET message.

layer_bit_rate_scale: has similar semantics to bit_rate_scale layer_cpb_size_scale: has similar semantics to cpb_size_scale layer_level_info_present_flag[i]: specifies whether the level information about layer index i.
layer_level_idc[i]: indicates a level to which ith layer in the CVS conforms as specified in.
layer_hrd_info_present_flag[i]: specifies whether the hrd information about layer index i is present.
layer_bit_rate_value_minus1[i]: (together with layer_bit_rate_scale) specifies the maximum input bit rate of layer index i. Has similar semantics as bit_rate_value_minus1.
layer_avg_bit_rate_value_minus1[i]: (together with layer_bit_rate_scale) specifies average value of layer index.
layer_max_cpb_size_value_minus1[i]: (together with layer_ cpb_size scale) specifies maximum cpb size value of layer index i.
max_bitrate_calc_window[i]: specifies the window to calculate maximum bit rate for layer index i.
HRD Extensions In FIG. 3, the bitstream contains 2 layers or views. It is possible for the whole bitstream to be decoded with one decoder (scenario 1) or each layer is able to be decoded with separate decoders (scenario 2). FIG. 4 illustrates a diagram with a 2-decoder model case, where each layer is decoded.

hrd_parameters( ) are defined differently with scenario 1 and 2: in scenario 1, parameters of both BL and EL should be included within one hrd_parameters( ) while in scenario 2 parameters of BL and EL should be included in separate hrd_parameters( ) However, in the current hrd_parameters( ) syntax, specification is allowed to be specified for each layer set, which means that only scenario 1 is supported.

To solve this problem, the syntax is modified so that scenario-2-type hrd parameters( ) are able to be optionally transmitted in vps_extension( ) and sps_extension( ).
Table 4 shows vps_extension( ) syntax.

| vps_extension( ) { | Descriptor |
|---|---|
| ... | |
| for(i=0; i<=vps_num_layer_sets_minus1; i++) | |
|   for(j=1; j<=vps_max_layer_id; j++) | |
|     if(layer_id_included_flag[i][j]) { | |
|       layer_set_hrd_layer_info_present_flag[i][j] | u(1) |
|       if(layer_set_hrd_layer_info_present_flag[i][j]) { | |
|         hrd_paramaters(cprm_present_flag[i], | |
| vps_max_sub_layers_minus1) | |
|       } | |
|     ... | |
| } | | layer_set_hrd_layer_info_present_flag[i][j]: specifies whether the hrd information about layer index j in layer set i is present.
Table 5 shows vps_extension( ) syntax.

| vps_extension( ) { | Descriptor |
|---|---|
| ... | |
| for(i=0; i<=vps_num_hrd_parameters - 1; i++) | |
|   1stIdx = hrd_layer_set_idx[i] | |
|   for(j=1; j<=vps_max_layer_id; j++) | |
|     if(layer_id_included_flag[1stIdx][j]) { | |
|       layer_set_hrd_layer_params_present_flag[i][j] | u(1) |
|       if(layer_set_hrd_layer_params_present_flag[i][j]) { | |
|         hrd_paramaters(cprm_present_flag[i], | |
| vps_max_sub_layers_minus1) | |
|       } | |
|     } | |
|   ... | |
| } | |

Table 6 shows vps_extension( ) syntax.

| vps_extension( ) { | Descriptor |
|---|---|
| ... | |
| for(i=0; i<=vps_num_hrd_parameters - 1; i++) | |
|   1stIdx = hrd_layer_set_idx[i] | |
|   for(j=1; j<numLayersInIdList[1stIdx]; j++) | |
|     if(output_layer_flag[1stIdx][j]) { | |
|       layer_set_hrd_layer_params_present_flag[i][j] | u(1) |
|       if(layer_set_hrd_layer_params_present_flag[i][j]) { | |
|         hrd_paramaters(cprm_present_flag[i], | |
| vps_max_sub_layers_minus1) | |
|       } | |
|     } | |
|   ... | |
| } | |

Table 7 shows sps_extension( ) syntax.

| sps_extension( ) { | Descriptor |
|---|---|
| ... | |
|   layer_set_hrd_layer_info_present_flag | u(1) |
|   if(layer_set_hrd_layer_info_present_flag) { | |
|     hrd_parameters(1, sps_max_sub_layers_minus1) | |
|   } | |
|   ... | |
| } | | layer_set_hrd_layer_info_present flag equals to 1 specifies that hrd_parameters( ) that is applied just to the current layer which is a part of layer set is additionally contained in the CVS, and equals to 0 specifies that hrd_parameters( ) that is applied just to the current layer which is a part of layer set is not contained.

The methods described herein are for transmission of individual buffer parameters for HEVC scalable layers so that the system buffer management is able to be simplified. The first scheme includes a new SEI to transmit the information while the second scheme includes extensions to HRD parameters in vps_extension( ) and sps_extension( ).
Multilayer HRD Management Layer-based HRD buffer flow management for a multilayer operation is being described herein. Multi-layer representation of a bitstream is an inherent characteristic of scalability models as practiced, in SHVC and MV-HEVC, to allow temporal, spatial and view enhancements. In addition, a hybrid scalable model is also introduced allowing the transmission of AVC base layer stream to an AVC base layer decoder while an HEVC enhancement layer is transmitted to an HEVC decoder, separately. Traditional HRD buffer management approaches identify HRD parameters and number of HRD models on the whole e.g., for combined layers as opposed to on a per layer basis.

Figure 5:
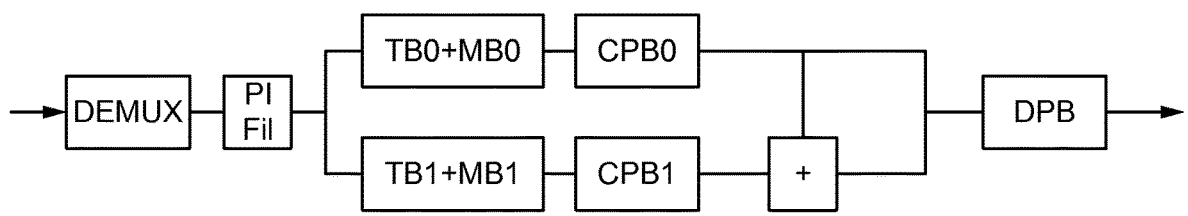
FIG. 5 illustrates an example of a multilayer HRD buffer flow model from a system STD operation perspective according to some embodiments.
Figure 6:
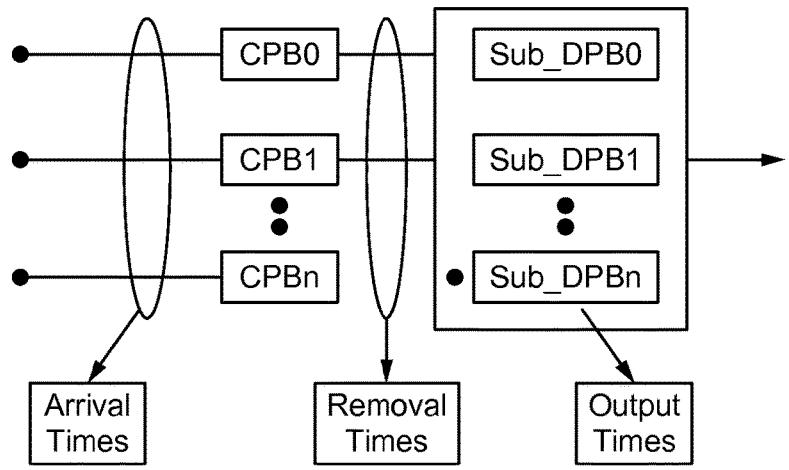
FIG. 6 shows a generalization of HRD buffer flow according to some embodiments.

FIG. 5 shows an example of a multilayer HRD buffer flow model from a system STD operation perspective. As shown, it includes a PID-based demux to map a multi-layered transport stream into its constituent layers (2 layers in this example). Each layer is then fed into TB & MB buffers to generate elementary streams as inputs to the CPB buffers. FIG. 6 shows a generalization of HRD buffer flow.

Table 8 shows vps_extension( ) syntax.

| vps_extension( ) { | Descriptor |
|---|---|
| ... | |
|     sub_cpb_parameters_table( ) | |
| ... | |
| } | |
| sub_cpb_parameters_table( ) | |
| ... | |
|   for(i=0; i<=vps_num_layer_sets_minus1; i++) | |
|     sub_cpb_info_present_flag[i] | u(1) |
|     if(sub_cpb_info_pressent_flag[i] { | |
|       for(k=0; k<vps_num_hrd_parameters && i!=hrd_layer_set_idx[k]; k++) | |
|         for(j=1; j<=vps_max_layer_id; j++) { | |
|           if(layer_id_included_flag[i][j] { | |
|           hrd_paramaters(cprm_present_flag[k], vps_max_sub_layers_minus1) | |
|           } | |
|         } | |
|       } | |
|     } | |
|   ... | |
| } | | sub_cpb_info_present_flag[i]: sub_cpb_info_present_flag[i]=1 indicates CPB parameters for each layer in the layer set i are given. sub_cpb_info_present_flag[i]=0 indicates CPB parameters for each layer are not present.

For BP & PT SEI messages, because of the strict output timing requirements, there is a single removal time and accordingly a single PT SEI message to be associated with all the layers. BP SEI messages are able to be associated with each layer for sub_CPB buffer management.

Table 9 shows a modified SEI message syntax.

| multilayer_hrd_info (payloadSize) { | Descriptor |
|---|---|
|   active_vps_id | u(4) |
|   for (i=1; i<= vps_num_layer_id; i++) { | |
|     layer_hrd_info_present_flag[i] | u(1) |
|     if(layer_hrd_info_present_flag[i]){ | |
|       layer_max_bitrate_value[i] | u(16) |
|       layer_max_cpb_size_value[i] | u(16) |
|     } | |
|   } | |
| } | |

Figure 7:
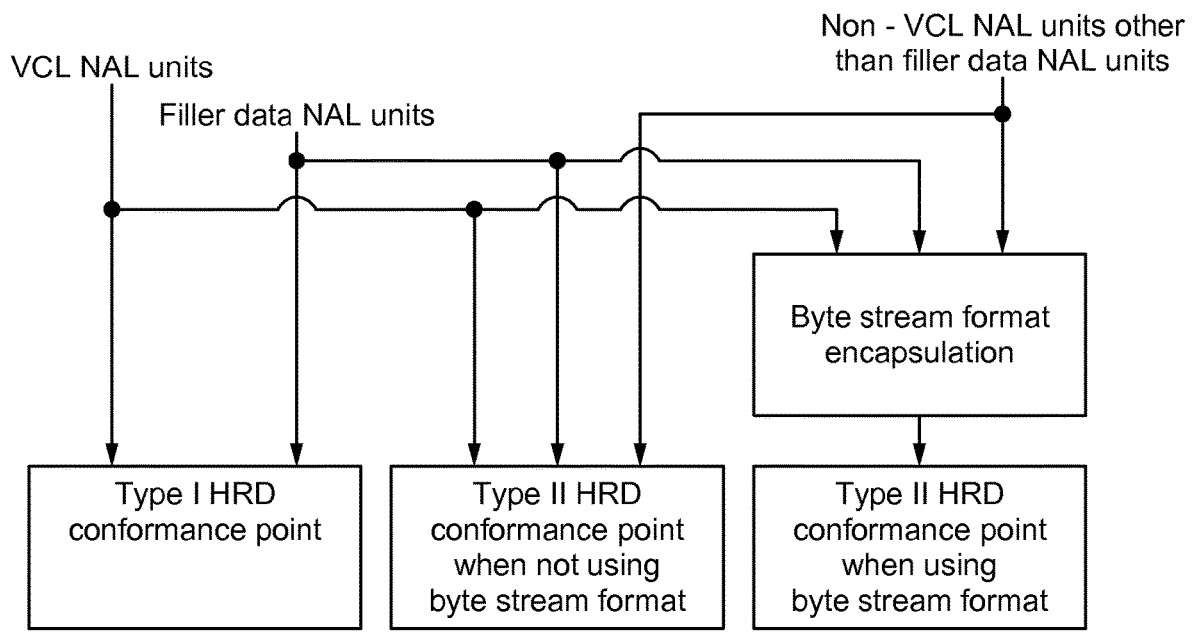
FIG. 7 illustrates a structure of byte streams and NAL unit streams for conformance checks according to some embodiments.

Described herein is the HRD and its use to check bitstream and decoder conformance. Two types of bitstreams or bitstream subsets are subject to HRD conformance checking. The first type, called a Type I bitstream, is a NAL unit stream containing only the VCL NAL units and NAL units with nal_unit_type equal to FD_NUT (filler data NAL units) for all access units in the bitstream. The second type, called a Type II bitstream, contains, in addition to the VCL NAL units and filler data NAL units for all access units in the bitstream, at least one of the following:

additional non-VCL NAL units other than filler data NAL units, all leading_zero_8bits, zero_byte, start_code, start_code_prefix_one_3bytes, and trailing_zero_8bits syntax elements that form a byte stream from the NAL unit stream. FIG. 7 shows the types of bitstream conformance points checked by the HRD.

The syntax elements of non-VCL NAL units (or their default values for some of the syntax elements), used for the HRD, are specified.

Two types of HRD parameter sets (NAL HRD parameters and VCL HRD parameters) are used. The HRD parameter sets are signaled through the hrd_parameters( ) syntax structure, which may be part of the SPS syntax structure or the VPS syntax structure.

Multiple tests are used for checking the conformance of a bitstream, which is referred to as the bitstream under test. For each test, the following steps are applied in the order listed:

1. An operation point under test, denoted as TargetOp, is selected. The layer identifier list OpLayerIdList of TargetOp includes the list of nuh_layer_id values, in increasing order of nub_layer_id values, present in the bitstream subset associated with TargetOp, which is a subset of the nuh_layer_id values present in the bitstream under test. The variable TargetLayerSetIdx is set equal to index of the layer set specified in the active VPS that exactly includes the layers in OpLayerIdList. The OpTid of TargetOp is equal to the highest TemporalID present in the bitstream subset associated with TargetOp.

2. TargetDecLayerIdList is set equal to OpLayerIdList of TargetOp, HighestTid is set equal to OpTid of TargetOp, and the sub-bitstream extraction process as specified is invoked with the bitstream under test, HighestTid, and TargetDecLayerIdList as inputs, and the output is assigned to BitstreamToDecode.

3. When at least one bitstream partition HRD SEI message is present, bitstream-specific CPB operation or bitstream-partition-specific CPB operation is selected and both CPB operations shall be tested for checking the conformance of a bitstream. When bitstream-specific CPB operation is tested, the subsequent steps apply for the bitstream under test. When bitstream-partition-specific CPB operation is tested, the subsequent steps apply to each bitstream partition of the bitstream under test, referred to as the bitstream partition under test. When bitstream-partition-specific CPB operation is tested and the input to the HRD is a bitstream, the bitstream partitions are derived with the demultiplexing process for deriving a bitstream partition.

4. The hrd_parameters( ) syntax structure and the sub_layer_hrd_parameters( ) syntax structure applicable to TargetOp are selected as follows:

If bitstream-specific CPB operation is tested, the following applies:

If TargetDecLayerIdList contains all nuh_layer_id values present in the bitstream under test, the hrd_parameters( ) syntax structure in the active SPS (or provided through an external means) is selected.

Otherwise, the hrd_parameters( ) syntax structure in the active VPS (or provided through some external means) that applies to TargetOp is selected.

Otherwise, the hrd_parameters( ) syntax structure that applies to the bitstream partition under test in the bitstream partition HRD SEI message that is included in a scalable nesting SEI message that applies to TargetOP (or provided through some external means) is selected.

Within the selected hrd_parameters( ) syntax structure, if BitstreamToDecode is a Type I bitstream, the sub_layer_hrd_parameters(HighestTid) syntax structure that immediately follows the condition "if (vcl_hrd_parameters_present_flag)" is selected and the variable NalHrdModeFlag is set equal to 0; otherwise (BitstreamToDecode is a Type II bitstream), the sub_layer_hrd_parameters(HighestTid) syntax structure that immediately follows either the condition "if(vcl_hrd_parameters_present_flag)" (in this case the variable NalHrdModeFlag is set equal to 0) or the condition "if(nal_hrd_parameters_present_flag)" (in this case the variable NalHrdModeFlag is set equal to 1) is selected. When BitstreamToDecode is a Type II bitstream and NalHrdModeFlag is equal to 0, all non-VCL NAL units except filler data NAL units, and all leading_zero_8bits, zero_byte, start_code_prefix_one_3bytes, and trailing_zero_8bits syntax elements that form a byte stream from the NAL unit stream, when present, are discarded from BitstreamToDecode, and the remaining bitstream is assigned to BitstreamToDecode.

5. An access unit associated with a buffering period SEI message (present in BitstreamToDecode or available through external means) applicable to TargetOp is selected as the HRD initialization point and referred to as access unit 0. An applicable buffering period SEI message is selected from access unit 0 as follows:

If bitstream_specific CPB operation is tested, the following applies:
  If TargetDecLayerIdList contains all nuh_layer_id values present in the bitstream under test, a non-nested buffering period SEI message is selected.
  Otherwise, a buffering period SEI message included in the scalable nesting SEI message with bitstream_subset_flag equal to 1 and applicable to TargetOp is selected.
  Otherwise, a buffering period SEI message included in the bitstream partition nesting SEI message applicable to the bitstream partition under test is selected.

6. For each access unit in BitstreamToDecode starting from access unit 0, a buffering period SEI message (present in BitstreamToDecode or available through external means) that is associated with the access unit and applies to TargetOp is selected, a picture timing SEI message (present in BitstreamToDecode or available through external means not specified) that is associated with the access unit and applies to TargetOp is selected, and when SubPicHrdFlag is equal to 1 and sub_pic_cpb_params_in_pic_timiflg_sei_flag is equal to 0, decoding unit information SEI messages (present in BitstreamToDecode or available through external means not specified) that are associated with decoding units in the access unit and apply to TargetOp are selected as follows.

If bitstream-specific CPB operation is tested, the following applies:
  If TargetDecLayerIdList contains all nuh_layer_id values present in the bitstream under test, non-nested buffering period, picture timing and decoding unit information SEI messages are selected.
  Otherwise, buffering period, picture timing and decoding unit information SEI messages included in the scalable nesting SEI message with bitstream_subset_flag equal to 1 and applicable to TargetOP are selected.
  Otherwise, buffering period. picture timing and decoding unit information SEI messages included in the bitstream partition nesting SEI message applicable to the bitstream partition under test are selected.

7. A value of SchedSelIdx is selected as follows.
  If bitstream-specific CPB operation is tested, the selected SchedSelIdx shall be in the range of 0 to cpb_cnt_minus1[HighestTid], inclusive, where cpb_cnt_minus1[HighestTid] is found in the sub_layer_hrd_parameters(HighestTid) syntax structure as selected above.
  Otherwise, a SchedSelCombIdx is selected for the bitstream under test and used for each bitstream partition under test. The selected SchedSelCombIdx shall be in the range of 0 to num_bsp_sched_combinations_minus1, incluisive. The selected SchedSelIdx shall be equal to bsp_comb_sched_idx[SchedSelCombIdx][j] of the bitstream partition HRD message applicable to TargetOp where j is the index of the bitstream partition under test.

When the coded picture in access unit 0 has nal_unit_type equal to CRA_NUT or BLA_W_LP, and irap_cpb_params_present_flag in the selected buffering period SEI message is equal to 1, either of the following applies for selection of the initial CPB removal delay and delay offset:

If NalHrdModeFlag is equal to 1, the default initial CPB removal delay and delay offset represented by nal_initial_cpb_removal_delay[SchedSelIdx] and nal_initial_cpb_removal_offset[SchedSelIdx], respectively, in the selected buffering period SEI message are selected. Otherwise, the default initial CPB removal delay and delay offset represented by vcl_initial_cpb_removal_delay[SchedSelIdx] and vcl_initial_cpb_removal_offset[SchedSelIdx], respectively, in the selected buffering period SEI message are selected. The variable DefaultInitCpbParamsFlag is set equal to 1.

If NalHrdModeFlag is equal to 1, the alternative initial CPB removal delay and delay offset represented by nal_initial_alt_cpb_removal_delay[SchedSelIdx] and nal_initial_alt_cpb_removal_offset[SchedSelIdx], respectively, in the selected buffering period SET message are selected. Otherwise, the alternative initial CPB removal delay and delay offset represented by vcl_initial_alt_cpb_removal_delay[SchedSelIdx] and vcl_initial_alt_cpb_removal_offset[SchedSelIdx], respectively, in the selected buffering period SEI message are selected. The variable DefaultInitCpbParamsFlag is set equal to 0, and the RASL access units associated with access unit 0 are discarded from BitstreamToDecode and the remaining bitstream is assigned to BitstreamToDecode.

9. For bitstream-partition-specific CPB operation. SubPicHrdFlag is set equal to 1. For bitstream-specific CPB operation. When sub_pic_hrd_params_present_flag in the selected hrd_parameters( ) syntax structure is equal to 1, the CPB is scheduled to operate either at the access unit level (in which case the variable SubPicHrdFlag is set equal to 0) or at the sub-picture level (in which case the variable SubPicHrdFlag is set equal to 1).

For each operation point under test, the number of bitstream conformance tests for bitstream-specific CPB operation to be performed is equal to n0*n1*(n2*2+n3)*n4, where the values of n0, n1, n2, n3, and n4 are specified as follows:

n0 is derived as follows:
  If BitstreamToDecode is a Type I bitstream, n0 is equal to 1.
  Otherwise (BitstreamToDecode is a Type II bitstream), n0 is equal to 2.
n1 is equal to cpb_cnt_minus1[HighestTid]+1.
n2 is the number of access units in BitstreamToDecode that each is associated with a buffering period SEI message applicable to TargetOp and for each of which both of the following conditions are true:
  nal_unit_type is equal to CRA_NUT or BLA_W_LP for the VCL NAL units;
  The associated buffering period SEI message applicable to TargetOp has irap_cpb_params_present_flag equal to 1.
n3 is the number of access units in BitstreamToDecode that each is associated with a buffering period SEI message applicable to TargetOp and for each of which one or both of the following conditions are true:
  nal_unit_type is equal to neither CRA_NUT nor BLA_W_LP for the VCL NAL units;
  The associated buffering period SEI message applicable to TargetOp has irap_cpb_params_present_flag equal to 0.

If sub_pic_hrd_params_present_flag in the selected hrd_parameters( ) syntax structure is equal to 0, n4 is equal to 1;
Otherwise, n4 is equal to 2.

When BitstreamToDecode is a Type II bitstream, the following applies:

If the sub_layer_hrd_parameters(HighestTid) syntax structure that immediately follows the condition "if (vcl_hrd_parameters_present_flag)" is selected, the test is conducted at the Type I conformance point shown in FIG. 7, and only VCL and filler data NAL units are counted for the input bit rate and CPB storage.

Otherwise, (the sub_layer_hrd_parameters(HighestTid) syntax structure that immediately follows the condition "if(nal_hrd_parameters_present_flag)" is selected, the test is conducted at the Type II conformance point shown in FIG. 7, and all bytes of the Type II bitstream, which may be a NAL unit stream or a byte stream, are counted for the input bit rate and CPB storage.

NAL HRD parameters established by a value of SchedSelIdx for the Type II conformance point shown in FIG. 7 are sufficient to also establish VCL HRD conformance for the Type I conformance point shown in FIG. 7 for the same values of InitCpbRemovalDelay[SchedSelIdx], BitRate [SchedSelIdx] and CpbSize[SchedSelIdx] for the VBR case (cbr_flag[SchedSelIdx] equal to 0). This is because the data flow into the Type I conformance point is a subset of the data flow into the Type II conformance point and because, for the VBR case, the CPB is allowed to become empty and stay empty until the time a next picture is scheduled to begin to arrive. For example, when decoding a CVS conforming to one or more of the profiles using a decoding process, when NAL HRD parameters are provided for the Type II conformance point that not only fall within the bounds set for NAL HRD parameters for profile conformance but also fall within the bounds set for VCL HRD parameters for profile conformance, conformance of the VCL HRD for the Type I conformance point is also assured to fall within specified bounds.

All VPSs, SPSs and PPSs referred to in the VCL NAL units, and the corresponding buffering period, picture timing and decoding unit information SET messages shall be conveyed to the HRD, in a timely manner, either in the bitstream (by non-VCL NAL units), or by other means.

The specification for "presence" of non-VCL NAL units that contain VPSs, SPSs, PPSs, buffering period SET messages, picture timing SET messages, or decoding unit information SEI messages is also satisfied when those NAL units (or just some of them) are conveyed to decoders (or to the HRD) by other means. For the purpose of counting bits, only the appropriate bits that are actually present in the bitstream are counted.

As an example, synchronization of such a non-VCL NAL unit, conveyed by means other than presence in the bitstream, with the NAL units that are present in the bitstream, are able to be achieved by indicating two points in the bitstream, between which the non-VCL NAL unit would have been present in the bitstream, had the encoder decided to convey it in the bitstream.

When the content of such a non-VCL NAL unit is conveyed for the application by some means other than presence within the bitstream, the representation of the content of the non-VCL NAL unit is not required to use the same syntax as specified.

When HRD information is contained within the bitstream, it is possible to verify the conformance of a bitstream to the requirements of this clause based solely on information contained in the bitstream. When the HRD information is not present in the bitstream, as is the case for all "standalone" Type I bitstreams, conformance is verified when the HRD data are supplied by some other means.

Figure 8:
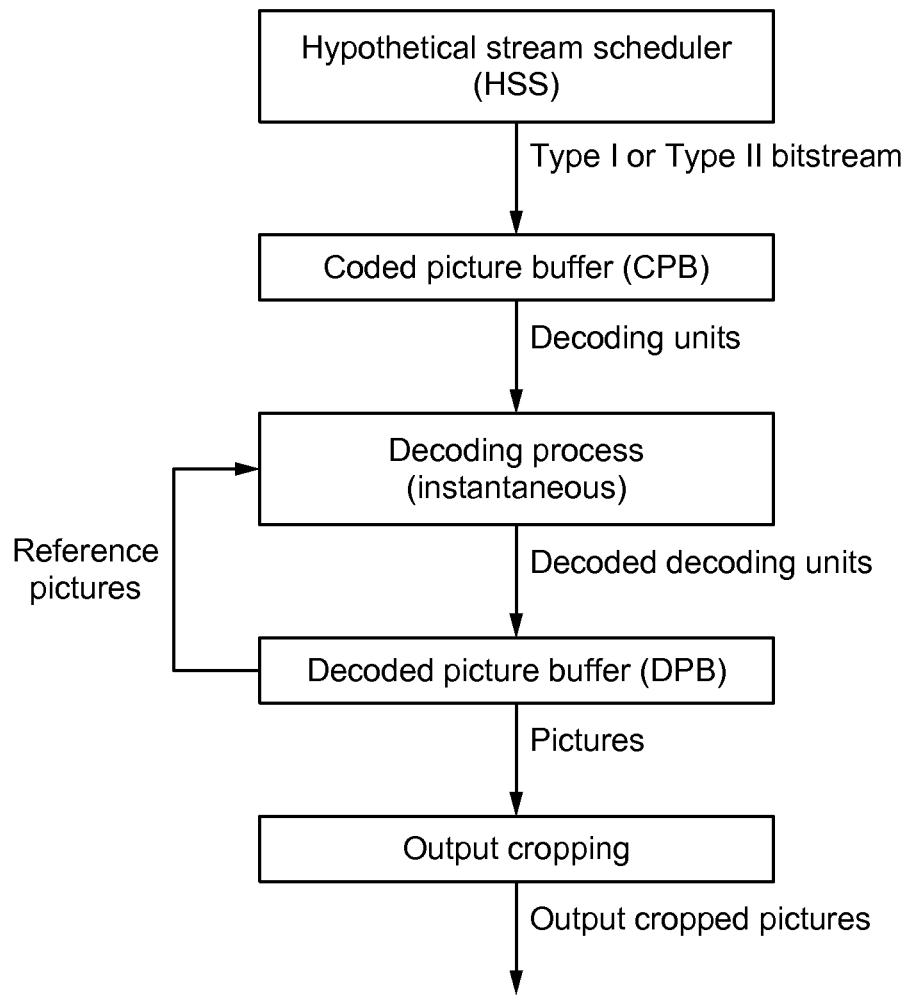
FIG. 8 illustrates an HRD buffer model according to some embodiments.

For bitstream-specific CPB operation, The HRD contains a coded picture buffer (CPB), an instantaneous decoding process, a decoded picture buffer (DPB), and output cropping as shown in FIG. 8.

Figure 9:
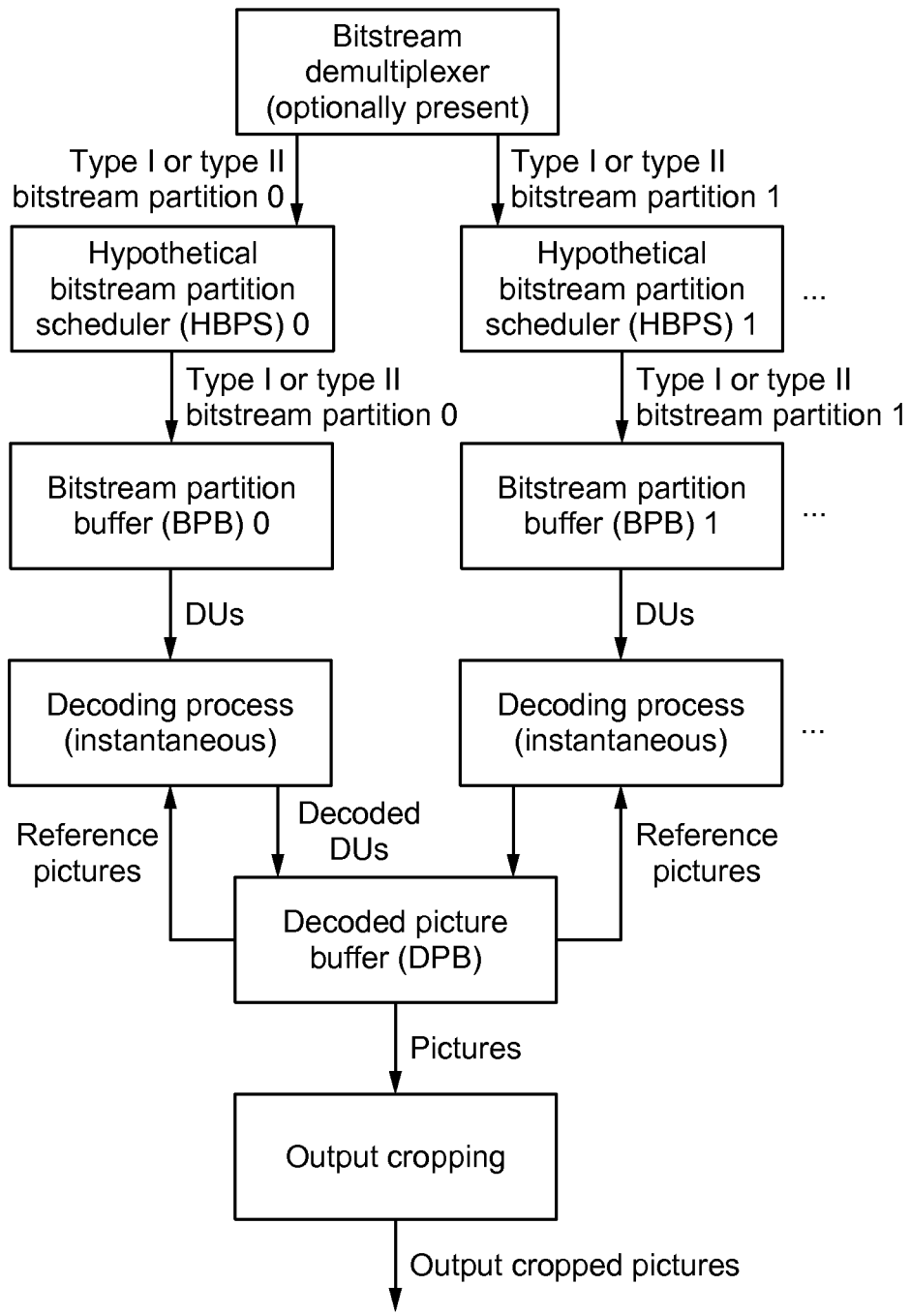
FIG. 9 illustrates a diagram of a bitstream-partition-specific CPB operation according to some embodiments.

For bitstream-partition-specific CPB operation. the HRD contains a bitstream demuiltiplexer (optionally present), two or more bitstream partition buffers (BPB), two or more instantaneous decoding processes, a decoded picture buffer (DPB), and output cropping as shown in FIG. 9.

For each bitstream conformance test, the CPB size (number of bits) for bitstream-specific CPB operation and tile BPB size for bitstream-partition-specific CPB operation is CpbSize[SchedSelIdx], where SchedSelIdx and the HRD parameters are specified above in this clause. The DPB size (number of picture storage buffers) is sps_max_dec_pic_buffering_minus1[HighestTid]+1.

The variable SubPicHrdPreferredFlag is either specified by external means, or when not specified by external means, set equal to 0.

When the value of the variable SubPicHrdFlag has not been set by step 9 above in this clause, it is derived as follows:
SubPicHrdFlag=SubPicHrdPreferredFlag && sub_pic_hrd_params_present_flag If SubPicHrdFlag is equal to 0, the HRD operates at access unit level and each decoding unit is an access unit. Otherwise the HRD operates at sub-picture level and each decoding unit is a subset of an access unit.

If the HRD operates at access unit level, each time a decoding unit that is an entire access unit is removed from the CPB. Otherwise (the HRD operates at sub-picture level), each time a decoding unit that is a subset of an access unit is removed from the CPB. In both cases, each time an entire decoded picture is output from the DPB, though the picture output time is derived based on the differently derived CPB removal times and the differently signaled DPB output delays.

The following is specified for expressing the constraints in this annex:

Each access unit is referred to as access unit n, where the number n identifies the particular access unit. Access unit 0 is selected per step 4 above. The value of n is incremented by 1 for each subsequent access unit in decoding order.

Each decoding unit is referred to as decoding unit m, where the number m identifies the particular decoding unit. The first decoding unit in decoding order in access unit 0 is referred to as decoding unit 0. The value of m is incremented by 1 for each subsequent decoding unit in decoding order.

The numbering of decoding units is relative to the first decoding unit in access unit 0.

Picture n refers to the coded picture or the decoded picture of access unit n. The HRD operates as follows:

The HRD is initialized at decoding unit 0, with the both the CPB and the DPB and each BPB being set to be empty (the DPB fullness is set equal to 0).

After initialization, the HRD is not initialized again by subsequent buffering period SET messages.

For bitstream-specific CPB operation, data associated with decoding units that flow into the CPB according to a specified arrival schedule are delivered by the HSS. For bitstream-partition-specific CPB operation, data associated with decoding units that flow into the BPB according to a specified arrival schedule are delivered by an HBPS.

When bitstream-partition-specific CPB operation is used, each bitstream partition with index j is processed with SchedSelIdx equal to bsp_comb_sched_idx[SchedSelCombIdx][j] of the bitstream partition HRD message applicable to TargetOp and the HSS replaced by the HPBS.

The data associated with each decoding unit is removed and decoded instantaneously by the instantaneous decoding process at the CPB removal time of the decoding unit.

Each decoded picture is placed in the DPB.

A decoded picture is removed from the DPB when it becomes no longer needed for inter prediction reference and no longer needed for output.

HSS, HBPS and HRD information concerning the number of enumerated delivery schedules and their associated bit rates and buffer sizes is specified in clauses. The HRD is initialized as specified by the buffering period SET message. The removal timing of decoding units from the CPB and output timing of decoded pictures from the DPB is specified using information in picture timing SET messages or in decoding unit information SET messages. All timing information relating to a specific decoding unit shall arrive prior to the CPB removal time of the decoding unit.

The requirements for bitstream conformance are specified, and the HRD is used to check conformance of bitstreams as specified above in this clause and to check conformance of decoders as specified.

While conformance is guaranteed under the assumption that all picture-rates and clocks used to generate the bitstream match exactly the values signaled in the bitstream, in a real system each of these may vary from the signaled or specified value.

All the arithmetic described herein is performed with real values, so that no rounding errors propagate. For example, the number of bits in a CPB just prior to or after removal of a decoding unit is not necessarily an integer.

The variable ClockTick is derived as follows and is called a clock tick:

ClockTick=vui_num_units_in_tick÷vui_time_scale

The variable ClockSubTick is derived as follows and is called a clock sub-tick:

ClockSubTick=ClockTick÷(tick_divisor_minus2+2)

Operation of Coded Picture Buffer (CPB) and Bitstream Partition Buffer (BPB)

The specifications in this clause apply independently to each set of CPB parameters that is present and to both the Type I and Type II conformance points shown in FIG. 7, and the set of CPB parameters is selected as specified.

Timing of Decoding Unit Arrival

If SubPicHrdFlag is equal to 0, the variable subPicParamsFlag is set equal to 0, and the process specified in the remainder of this clause is invoked with a decoding unit being considered as an access unit, for derivation of the initial and final CPB arrival times for access unit n.

Otherwise (SubPicHrdFlag is equal to 1), the process specified in the remainder of this clause is first invoked with the variable subPicParamsFlag set equal to 0 and a decoding unit being considered as an access unit, for derivation of the initial and final CPB arrival times for access unit n, and then invoked with subPicParamsFlag set equal to 1 and a decoding unit being considered as a subset of an access unit, for derivation of the initial and final CPB arrival times for the decoding units in access unit n.

The variables InitCpbRemovalDelay[SchedSelIdx] and InitCpbRemovalDelayOffset[SchedSelIdx] are derived as follows:

If one or more of the following conditions are true, InitCpbRemovalDelay[SchedSelIdx] and InitCpbRemovalDelayOffset[SchedSelIdx] are set equal to the values of the buffering period SET message syntax elements nal_initial_alt_cpb_removal_delay[SchedSelIdx] and nal_initial_alt_cpb_removal_offset[SchedSelIdx], respectively, when NalHrdModeFlag is equal to 1, or vcl_initial_alt_cpb_removal_delay[SchedSelIdx] and vcl_initial_alt_cpb_removal_offset[SchedSelIdx], respectively, when NalHrdModeFlag is equal to 0, where the buffering period SET message syntax elements are selected as specified:

Access unit 0 is a BLA access unit for which each coded picture has nal_unit_type equal to BLA_W_RADL or BLA_N_LP, and the value of irap_cpb_params_present_flag of the buffering period SET message is equal to 1.

Access unit 0 is a BLA access unit for which the coded picture has nal_unit_type equal to BLA_W_LP or is a CRA access unit, and the value of irap_cpb_params_present_flag of the buffering period SEI message is equal to 1, and one or more of the following conditions are true:

UseAltCpbParamsFlag for access unit 0 is equal to 1.
DefaultInitCpbParamsFlag is equal to 0.
The value of subPicParamsFlag is equal to 1.

Otherwise, InitCpbRemovalDelay[SchedSelIdx] and InitCpbRemovalDelayOffset[SchedSelIdx] are set equal to the values of the buffering period SEI message syntax elements nal_initial_cpb_removal_delay[SchedSelIdx] and nal_initial_cpb_removal_offset[SchedSelIdx], respectively, when NalHrdModeFlag is equal to 1, or vcl_initial_cpb_removal_delay[SchedSelIdx] and vcl_initial_cpb_removal_offset[SchedSelIdx], respectively, when NalHrdModeFlag is equal to 0, where the buffering period SEI message syntax elements are selected as specified.

Variables BspSyncFlag[bspIdx][m], BspSyncBspIdx[bspIdx][m] and BspSyncDuIdx[bspIdx][m] are derived for bitstream-partition-specific CPB operation for bitstream partitions with index bspIdx greater than 0 as follows:

If du_based_bpb_sync_flag[SchedSelCombIdx] of the bitstream partition HRD message applicable to TargetOp is equal to 1, the following applies If the DU preceding, in decoding order within tile bitstream, tile m-th DU of bitstream partition with index bspIdx belongs to to a bitstream partition with all index prevBspIdx less than bspIdx, BspSyncFlag[bspIdx][m] is set equal to 1. BspSyncBspIdx[bspIdx][m] is set equal to 1, BspSyncDuIdx[bspIdx][m] is set equal to tile decoding unit index of the preceding DU within bitstream partition with index prevBspIdx.

Otherwise, BspSyncFlag[bspIdx][m] is set equal to 0.

Otherwise, du_based_bpb_sync_flag[SchedSelCombIdx] of the bitstream partition HRD message applicable to TargetOP is equal to 0), the following applies:

If the DU is the first DU, in decoding order, of a picture and any picture in the inter-layer reference picture set has a nuh_layer_id value that belongs to a bitstream partition with a smaller index than bspIdx, BspSyncFlag[bspIdx][m] is set equal to 1, BspSyncBspIdx[bspIdx][m] is the greatest bitstream partition index refBspIdx smaller than bspIdx associated with the nuh_layer_id value refLayerId of any picture in the inter-layer reference picture set, and BspSyncDuIdx[bspIdx][m] is set equal to the decoding unit index (within the bitstream partition with index refBspIdx) of the last decoding unit of the picture with nuh_layer_id equal to refLayerId in the same access unit as tile m-th DU of bitstream partition with index bspIdx.

Otherwise, BspSyncFlag[bspIdx][m] is set equal to 0.

The time at which the first bit of decoding unit m begins to enter the CPB is referred to as the initial arrival time initArrivalTime[m].

If bitstream-specific CPB operation is used, decoding units are indexed in decoding order within the bitstream. Otherwise (bitstream-partition-specific CPB operation is used), decoding units are indexed in decoding order with each bitstream partition, and thus a decoding unit may be identified with the pair of the bitstream partition index bspIdx and the decoding unit index m within the bitstream partition.

The initial arrival time of decoding unit m is derived as follows:

If the decoding unit is decoding unit 0 (e.g., m=0) and either bitstream-specific CPB operation is used or the decoding unit belongs to the base bitstream partition, initArrivalTime[0]=0.

Otherwise, if the decoding unit is decoding unit 0, bitstream-partition-specific CPB operation is used, the decoding unit does not belong to the base bitstream partition and cbr_flag[SchedSelIdx] is equal to 1, the following applies:

initArrivalTime [0] is obtained from the bitstream partition initial arrival tune SEI message applicable to TargetOp.

Otherwise, the following applies:

The variable bspSyncFlag is derived as follows:

If bitstream-specific CPB operation is used or the decoding unit belongs to the base bitstream partition or BspSyncFlag[bspIdx][m] is equal to 0, bspSyncFlag is set equal to 0.

Otherwise, bspSyncFlag is set equal to 1.

If cbr_flag[SchedSelIdx] is equal to 1, the initial arrival time for decoding unit m is equal to the final arrival time (which is derived below) of decoding unit m−1, e.g.,

```
if( !subPicParamsFlag)
    initArrivalTime[m] = AuFinalArrivalTime[m−1]
else
    initArrivalTime[m] = DuFinalArrivalTime[m−1]
```

When bspSyncFlag is equal to 1, it is a requirement of bitstream conformance that initArrivalTime[m] 1 is greater than or equal to the final arrival time of the decoding unit with index BspSyncDuIdx[bspIdx] [m] in the bitstream partition with index BspSyncBspIdxl[bspIdx] [m].

Otherwise (cbr_flag[SchedSelIdx] is equal to 0), the initial arrival time for decoding unit m is derived as follows:

```
if(!subPicParamsFlag)
    initArrivalTime[m] = Max(AuFinalArrivalTime[m − 1],
initArrivalEarliestTime[m])
    else
        initArrivalTime[m] = Max(DuFinalArrivalTime[m − 1],
initArrivalEarliestTime[m], refFinalArrivalTime)
    where initArrivalEarliestTime[m] is derived as follows:
    The variable tmpNominalRemovalTime is derived as follows:
        if(!subPicParamsFlag)
            tmpNominalRemovalTime = AuNominalRemovalTime[m]
        else
            tmpNominalRemovalTime = DuNominalRemovalTime[m]
``` where AuNominalRemovalTime[m] and DuNominalRemovalTime[m] are the nominal CPB removal time of access unit m and decoding unit m, respectively, as specified.

If decoding unit m is not the first decoding unit of a subsequent buffering period, initArrivalEarliestTime[m] is derived as follows:

initArrivalEarliestTime[m]=tmpNominalRemovalTime−(InitCpbRemovalDelay[SchedSelIdx]+ InitCpbRemovalDelayOffset[SchedSelIdx])÷ 90000

Otherwise (decoding unit m is the first decoding unit of a subsequent buffering period), initArrivalEarliestTime[m] is derived as follows:

initArrivalEarliestTime[m]=tmpNominalRemovalTime−(InitCpbRemovalDelay[SchedSelIdx]÷ 90000)

and where refFinalArrivalTime is the final arrival time of the decoding unit with index BspSyncDuIdx[bspIdx][m] in the bitstream partition with index BspSyncBspIdx[bspIdx][m].

The final arrival time for decoding unit m is derived as follows:

```
if (!subPicParamsFlag)
    AuFinalArrivalTime[m] = initArrivalTime[m] + sizeInbits[m] ÷
BitRate[SchedSelIdx]
    else
```

DuFinalArrivaltime[m]=initArrivalTime[m]+sizeInbits [m] BitRate[SchedSelIdx] where sizeInbits[m] is the size in bits of decoding unit m, counting the bits of the VCL NAL units and the filler data NAL units for the Type I conformance point or all bits of the Type II bitstream for the Type II conformance point, where the Type I and Type II conformance points are as shown in FIG. 7.

The values of SchedSelIdx, BitRate[SchedSelIdx], and CpbSize[SchedSelIdx] are constrained as follows:

If the content of the selected hrd_parameters( ) syntax structures for the access unit containing decoding unit m and the previous access unit differ, the HSS selects a value SchedSelIdx1 of SchedSelIdx from among the values of SchedSelIdx provided in the selected hrd_parameters( ) syntax structures for the access unit containing decoding unit m that results in a BitRate[SchedSelIdx1] or CpbSize [SchedSelIdx1] for the access unit containing decoding unit m. The value of BitRate[SchedSelIdx1] or CpbSize[SchedSelIdx1] may differ from the value of BitRate[SchedSelIdx0] or CpbSize[SchedSelIdx0] for the value SchedSelIdx0 of SchedSelIdx that was in use for the previous access unit.

Otherwise, the HSS continues to operate with the previous values of SchedSelIdx, BitRate[SchedSelIdx] and CpbSize[SchedSelIdx].

When the HSS selects values of BitRate[SchedSelIdx] or CpbSize[SchedSelIdx] that differ from those of the previous access unit, the following applies:

The variable BitRate[SchedSelIdx] comes into effect at the initial CPB arrival time of the current access unit.

The variable CpbSize[SchedSelIdx] comes into effect as follows:

If the new value of CpbSize[SchedSelIdx] is greater than the old CPB size, it comes into effect at the initial CPB arrival time of the current access unit.

Otherwise, the new value of CpbSize[SchedSelIdx] comes into effect at the CPB removal time of the current access unit.

Scalable Nesting SEI Message Semantics

The scalable nesting SEI message provides a mechanism to associate SEI messages with bitstream subsets corresponding to various operation points or with specific layers or sub-layers. A scalable nesting SEI message contains one or more SEI messages. bitstream_subset_flag equal to 0 specifies that the SEI messages contained in the scalable nesting SEI message apply to specific layers or sub-layers. bitstream_subset_flag equal to 1 specifies that the SEI messages contained in the scalable nesting SEI message apply to one or more sub-bitstreams resulting from a sub-bitstream extraction process with inputs based on the syntax elements of the scalable nesting SEI message as specified below.

When a buffering period SEI message, a picture timing SEI message, or a decoding unit information SEI message is contained in the scalable nesting SEI message with bitstream_subset_flag equal to 0, they apply to the bitstream partition including layers included in the list nestingLayerIdList[i] as derived herein.

Table 10 shows VPS VUI syntax.

|  | Descriptor |
|---|---|
| vps_vui( ) { | |
| ... | |
|    num_bitstream_partitions_minus1 | ue(v) |
|    if(num_bitstream_partitions_minus1) | |
|      vps_vui_bsp_hrd( ) | |
| ... | |
| } | | num_bitstream_partitions_minus1 equal to 0 specifies no bitstream-partition-specific HRD parameters are present. num_bitstream_partitions_minus1 plus 1 specifies the number of bitstream partitions for which HRD parameters are specified in the bitstream.

Table 11 shows another VPS VUI syntax.

|  | Descriptor |
|---|---|
| vps_vui( ) { | |
| ... | |
|    vps_vui_bsp_hrd_present_flag | u(1) |
|    if(vps_vui_bsp_hrd_present_flag) | |
|      vps_vui_bsp_hrd( ) | |
| ... | |
| } | | vps_vui_bsp_hrd_present_flag equal to 0 specifies that no bitstream-partition-specific HRD parameters are present. vps_vui_bsp_hrd_present_flag equal to 1 specifies that bitstream-specific HRD parameters are present.

Table 12 shows vps_vui_bsp_hrd syntax.

|  | Descriptor |
|---|---|
| vps_vui_bsp_hrd( ) { | |
|    vps_num_bsp_hrd_parameters_minus1 | ue(v) |
|    for(i=0; i<=vps_num_bsp_hrd_parameters_minus1; i++) { | |
|      if(i > 0) | |
|        bsp_cprms_present_flag[i] | u(1) |
|      hrd_parameters(bsp_cprms_present_flag[i], vps_max_sub_layers_minus1) | |
|    } | |
|    for(h=1; h<=vps_num_layer_sets_minus1; h++) { | |
|      num_bitstream_partitions[h] | ue(v) |
|      for(i=0; i<=num_bitstream_partitions[h]; i++) { | |
|        for(j=0; j<=vps_max_layers_minus1; j++) | |
|          if(layer_id_included_flag[h][j]) | |
|            layer_in_bsp_flag[h][i][j] | u(1) |
|      } | |
|      if(num_bitstream_partitions[h]) { | |
|        num_bsp_sched_combinations[h] | ue(v) |
|        for(i=0; i<=num_bsp_sched_combinations[h]; i++) { | |
|          du_based_bpb_sync_flag[h][i] | u(1) |
|          for(j=0; j<=num_bitstream_partitions[h]; j++) { | |
|            bsp_comb_hrd_idx[h][i][j] | ue(v) |
|            bsp_comb_sched_idx[h][i][j] | ue(v) |
|          } | |
|        } | |
|      } | |
|    } | |
| } | | vps_num_bsp_hrd_parameters_minus1 plus 1 specifies the number of hrd_parameters( ) syntax structures present within the vps_vui_bsp_hrd( ) syntax structure.

bsp_cprms_present_flag[i] equal to 1 specifies that the HRD parameters that are common for all sub-layers are present in the i-th hrd_parameters( ) syntax structure in the vps_vui_bsp_hrd( ) syntax structure. bsp_cprms_present_flag[i] equal to 0 specifies that the HRD parameters that are common for all sub-layers are not present in the i-th hrd_parameters( ) syntax structure in the vps_vui_bsp_hrd( ) syntax structure and are derived to be the same as the (i−1)-th hrd_parameters( ) syntax structure in the in the vps_vui_bsp_hrd( ) syntax structure. bsp_cprms_present_flag[0] is inferred to be equal to 1.

num_bitstream_partitions[h] specifies the number of bitstream partitions for which HRD parameters are specified for the layer set with index h.

layer_in_bsp_flag[h][i][j] specifies that the layer with index j is a part of bitstream partition with index i within a layer set with index h. The bitstream partition with index j shall not include direct or indirect reference layers of any layers in bitstream partition i for any values of i and j in the range of 0 to num_bitstream_partitions[h]−1, inclusive, such that i is less than j.
num_bsp_sched_combinations [h] specifies the number of combinations of delivery schedules and hrd_parameters( ) specified for bitstream partitions for layer set with index h.
du_based_bpb_sync_flag[h][i] affects the CPB operation when the i-th combination of delivery schedules and hrd_parameters( ) is used.
bsp_comb_hrd_idx[h][i][j] specifies the index of hrd_parameters( ) within the vps_vui_bsp_hrd( ) syntax structure used in the i-th combination.
bsp_comb_sched_idx[h][i][j] specifies the index of delivery schedule within the hrd_parameters( ) syntax structure with the index bsp_comb_hrd_idx[h][i][j] that is used in the i-th combination.
Table 13 shows another vps_vui_bsp_hrd syntax.

|  | Descriptor |
|---|---|
| vps_vui_bsp_hrd( ) { | |
|     vps_num_bsp_hrd_parameters_minus1 | ue(v) |
|     for(i=0; i<=vps_num_bsp_hrd_parameters_minus1; i++) { | |
|         if(i > 0) | |
|             bsp_cprms_present_flag[i] | u(1) |
|         hrd_parameters(bsp_cprms_present_flag[i], vps_max_sub_layers_minus1) | |
|     } | |
|     for(h=0; h<=vps_max_layers_sets_minus1; h++) { | |
|         for(i=0; i<=num_bitstream_partitions_minus1; i++) { | |
|             for(j=0; j<=vps_max_layers_minus1; j++) | |
|                 bsp_idx_to_bsp_layer_idx[h][i][j] | u(v) |
|         } | |
|     } | |
|     for(h=1; h<=vps_num_layer_sets_minus1; h++) { | |
|         num_bsp_sched_combinations[h] | ue(v) |
|         for(i=0; i<=num_bsp_sched_combinations[h]; i++) { | |
|             du_based_bpb_sync_flag[h][i] | u(1) |
|             for(j=0; j<=num_bitstream_partitions_minus1; j++) { | |
|                 bsp_comb_hrd_idx[h][i][j] | ue(v) |
|                 bsp_comb_sched_idx[h][i][j] | ue(v) |
|             } | |
|         } | |
|     } | |
| } | | vps_num_bsp_hrd_parameters_minus1 plus 1 specifies the number of hrd_parameters( ) syntax structures present within the vps_vui_bsp_hrd( ) syntax structure.
bsp_cprms_present_flag[i] equal to 1 specifies that the HRD parameters that are common for all sub-layers are present in the i-th hrd_parameters( ) syntax structure in the vps_vui_bsp_hrd( ) syntax structure. bsp_cprms_present_flag[i] equal to 0 specifies that the HRD parameters that are common for all sub-layers are not present in the i-th hrd_parameters( ) syntax structure in the vps_vui_bsp_hrd( ) syntax structure and are derived to be the same as the (i−1)-th hrd_parameters( ) syntax structure in the in the vps_vui_bsp_hrd( ) syntax structure.
bsp_cprms_present_flag[0] is inferred to be equal to 1.
bsp_idx_to_bsp_layer_idx [h][i][j] specifies that the layer with index j is a part of bitstream partition with index i within a layer set with index h.
num_bsp_sched_combinations [h] specifies the number of combinations of delivery schedules and hrd_parameters( ) specified for bitstream partitions for layer set with index h.
du_based_bpb_sync_flag[h][i] affects the CPB operation when the i-th combination of delivery schedules and hrd_parameters( ) is used.
bsp_comb_hrd_idx[h][i][j] specifies the index of hrd_parameters( ) within the vps_vui_bsp_hrd( ) syntax structure used in the i-th combination.
bsp_comb_sched_idx[h][i][j] specifies the index of delivery schedule within the hrd_parameters( ) syntax structure with the index bsp_comb_hrd_idx[h][i][j] that is used in the i-th combination.
Table 14 shows bitstream partition HRD SEI message syntax.

|  | Descriptor |
|---|---|
| bsp_hrd(payloadSize) { | |
|     num_bitstream_partitions_minus1 | ue(v) |
|     for(i=0; i<=num_bitstream_partitions_minus1; i++) { | |
|         for(j=0; j<=vps_max_layers_minus1; j++) | |
|             if(layer_id_included_flag[nesting_op_idx[0]][j]) { | |
|                 layer_in_bsp_flag[i][j] | u(1) |
|         } | |
|     } | |
|     num_bsp_hrd_paramters_minus1 | ue(v) |
|     for(i=0; i<=num_bsp_hrd_parameters_minus1; i++) { | |
|         if (i>0) | |
|             bsp_cprms_present_flag[i] | u(1) |
|         hrd_parameters(bsp_cprms_present_flag[i], nesting_max_temporal_id_plus[0] − 1) | |
|     } | |

-continued

| | Descriptor |
|---|---|
| num_bsp_sched_combinations_minus1 | ue(v) |
| for(i=0; i<==numb_bsp_sched_combinations_minus1; i++) { | |
|     du_based_bpb_sync_flag[i] | u(1) |
|     for(j=0; j<==num_bitstream_partitions_minus1; j++) { | |
|         bsp_comb_hrd_idx[i][j] | ue(v) |
|         bsp_comb_sched_idx[i][j] | ue(v) |
|     } | |
| } | |
| } | |

Bitstream Partition HRD SEI Message Semantics

The bitstream partition HRD SEI message specifies HRD parameters for bitstream-partition-specific CPB operation.

When present, this SEI message shall be contained within a scalable nesting SEI message in an initial IRAP access unit. When this SEI message is contained in a scalable nesting SEI message, it shall be the only nested SEI message. In the scalable nesting SEI message containing this SEI message, bitstream_subset_flag shall be equal to 1, nesting_op_flag is equal to 1, default_op_flag shall be equal to 0 and nesting_num_ops_minus1 shall be equal to 0.

The message applies to the layer set specified by the list nestingLayerIDList[0]. num_bitstream_partitions_minus1 plus 1 specifies tile number of bitstream partitions for which HRD parameters are specified.

layer_in_bsp_flag[i][j] specifies that the layer with index j is a part of the bitstream partition with index i.

For bitstream conformance, the bitstream partition with index j shall not include direct or indirect reference layers of any layers in bitstream partition i for any values of i and j in the range of 0 to num_bitstream_partitions_minus1, inclusive, such that i is less than j.

num_bsp_hrd_parameters_minus1 plus 1 specifies the number of hrd_parameters( ) syntax structures present within the SEI message.

bsp_cprms_present_flag[i] equal to 1 specifies that the HRD parameters that are common for all sub-layers are present in the i-th hrd parameters( ) syntax structure in the SEI message.

bsp_cprms_present_flag[i] equal to 0 specifies that the HRD parameters that are common for all sub-layers are not present in the i-th hrd_parameters( ) syntax structure in the SEI message and are derived to be the same as the (i−1)-th hrd_parameters( ) syntax structure in the SEI message.

bsp_cprms_present_flag[0] is inferred to be equal to 1.

num_bsp_sched_combinations_minsu1 specifies the number of combinations of delivery schedules and hrd_parameters( ) specified for bitstream partitions.

du_based_bpb_sync_flag[i] affects the CPB operation when the i-th combination of delivery schedules and hrd_parameters( ) is used.

bsp_comb_hrd_idx[i][j] specifies the index of hrd_parameters( ) within the SEI message used in the i-th combination.

bsp_comb_sched_idx[i][j] specifies the index of delivery schedule within the hrd_parameters( ) syntax structure with the index bsp_comb_hrd_idx[i][j] that is used in the i-th combination.

Table 15 shows bitstream partition nesting SEI message syntax.

| | Descriptor |
|---|---|
| bsp_nesting(payloadSize) { | |
|   bsp_idx | ue(v) |
|   while(!byte_aligned( )) | |
|     bsp_nesting_zero_bit /*equal to 0*/ | u(1) |
|   do | |
|     sei_message( ) | |
|   while(more_rbsp_data( )) | |
| } | |

Tile bitstream partition nesting SEI message provides a mechanism to associate SEI message with a bitstream partition of a layer set.

When present this SEI message shall be contained within a scalable nesting SEI message. When this SEI message is contained in a scalable nesting SEI message, it shall be the only nested SEI message. In the scalable nesting SEI message containing this SEI message bitstream_subset_flag shall be equal to 1, nesting_op_flag is equal to 1, default_op_flag shall be equal to 0 and nesting_num_ops_minus1 shall be equal to 0.

The associated bitstream partition HRD message for the bitstream partition nesting SEI message is the preceding bitstream partition HRD message, in decoding order, that is nested in a scalable nesting SEI message with the same value of nesting_op_idx[0] as that for the scalable nesting SEI message containing the bitstream partition nesting SEI message. It is a requirement of bitstream conformance that when bitstream partition nesting SEI message is present, it shall have an associated bitstream partition HRD message within the same coded video sequence.

A bitstream partition nesting SEI message contains one or more SEI messages.

bsp_idx specifies the bitstream partition index among the bitstream partitions specified in the associated bitstream partition HRD message. This SEI message applies to the bitstream partition with index bsp_idx.

Table 16 shows bitstream partition initial arrival time SEI message syntax.

| | Descriptor |
|---|---|
| bsp_initial_arrival_time(payloadSize) { | |
|   if(NalHrdBpPresentFlag) | |
|     for(i=0; i<SchedCombCnt; i++) | |
|       nal_initial_arrival_delay[i] | u(v) |
|   else | |
|     for(i=0; i<SchedCombCnt; i++) | |
|       vcl_initial_arrival_delay[i] | u(v) |
| } | |

The bitstream partition initial arrival time SEI message specifies the initial arrival delays to be used in the bitstream-partition-specific CPB operation.

When present, the SEI message shall be contained within bitstream partition nesting SEI message that is contained in a scalable nesting SEI message. The same bitstream partition SEI message shall also contain a picture buffering SEI message.

nal_initial_arrival_delay[i] specifies the initial BPB arrival delays for the i-th schedule combination of the bitstream partition to which this SEI message applies, when NAL HRD parameters are in use.

vcl_initial_arrival_delay[i] specifies the initial BPB arrival delays for the i-th schedule combination of the bitstream partition to which the SEI message applies, when VCL HRD parameters are in use.

Demultiplexing Process for Deriving a Bitstream Partition

Inputs to the process are a bitstream, a layer identifier list bspLayerId[idx], and the number of layer identifiers numBspLayerId in the layer index list bspLayerId[idx].

Output of the process is a bitstream partition.

Let variable minBspLayerId be the smallest value of bspLayerId[idx] with any value of idx in the range of 0 to numBspLayerId−1, inclusive.

The output bitstream partition includes selected NAL units of the input bitstream in the same order as they appear in the input bitstream. The following NAL units of the input bitstream are omitted from the output bitstream partition, while the remaining NAL units of the input bitstream are included in the output bitstream partition:

Omit all NAL units that have a nuh_layer_id value other than bspLayerId[idx] with any value of idx in the range of 0 to numBspLayerId−1, inclusive.

Omit all SEI NAL units containing a scalable nesting SEI message for which no derived nesting LayerIdList[i] contains any layer identifier value equal to bspLayerId[idx] with any value of idx in the range of 0 to numBspLayerId−1, inclusive.

Omit all SEI NAL units containing a scalable nesting SEI message for which a derived nestingLayerIdList[i] contains a layer identifier value less than minBspLayerId.

Figure 10:
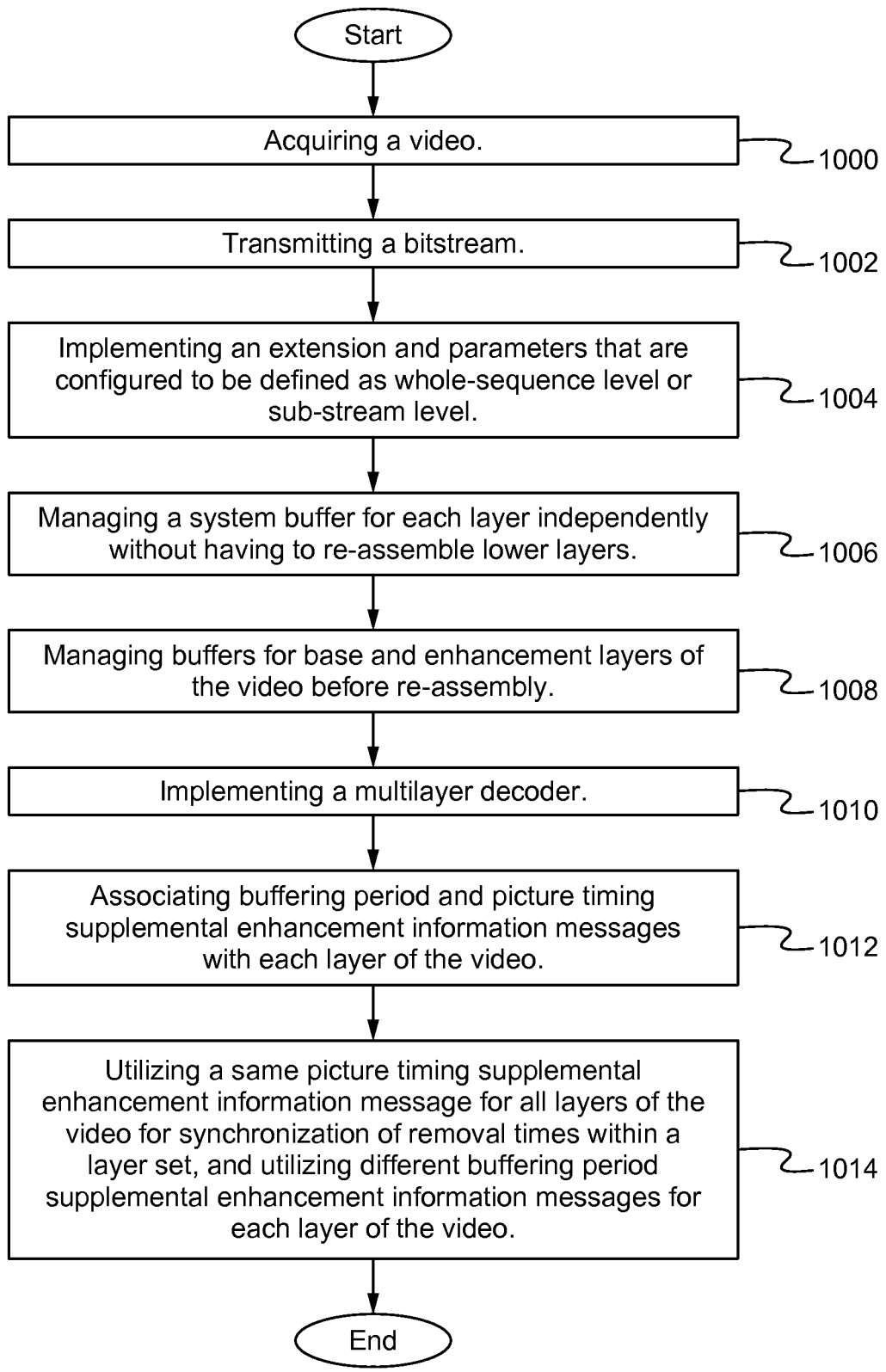
FIG. 10 illustrates a flowchart of implementing buffer management methods according to some embodiments.

FIG. 10 illustrates a flowchart of implementing buffer management methods according to some embodiments. In the step 1000, a video is acquired. The video is able to be acquired in any manner such as being captured using a digital camcorder, downloaded from another device, generated by a device or any other implementation. In the step 1002, a bitstream of the video is transmitted including signaling a maximum bit rate, average bit rate and maximum coded picture buffer size allocated for each layer in the bitstream. In the step 1004, an extension and parameters that are configured to be defined as whole-sequence level or sub-stream level are implemented. In the step 1006, a system buffer is managed for each layer independently without having to re-assemble lower layers. In the step 1008, buffers are managed for base and enhancement layers of the video before re-assembly. In the step 1010, a multilayer decoder is implemented. In the step 1012, buffering period and picture timing supplemental enhancement information messages are associated with each layer of the video. In the step 1014, a same picture timing supplemental enhancement information message for all layers of the video for synchronization of removal times within a layer set is utilized, and different buffering period supplemental enhancement information messages are utilized for each layer of the video. In some embodiments, fewer or additional steps are implemented.

Figure 11:
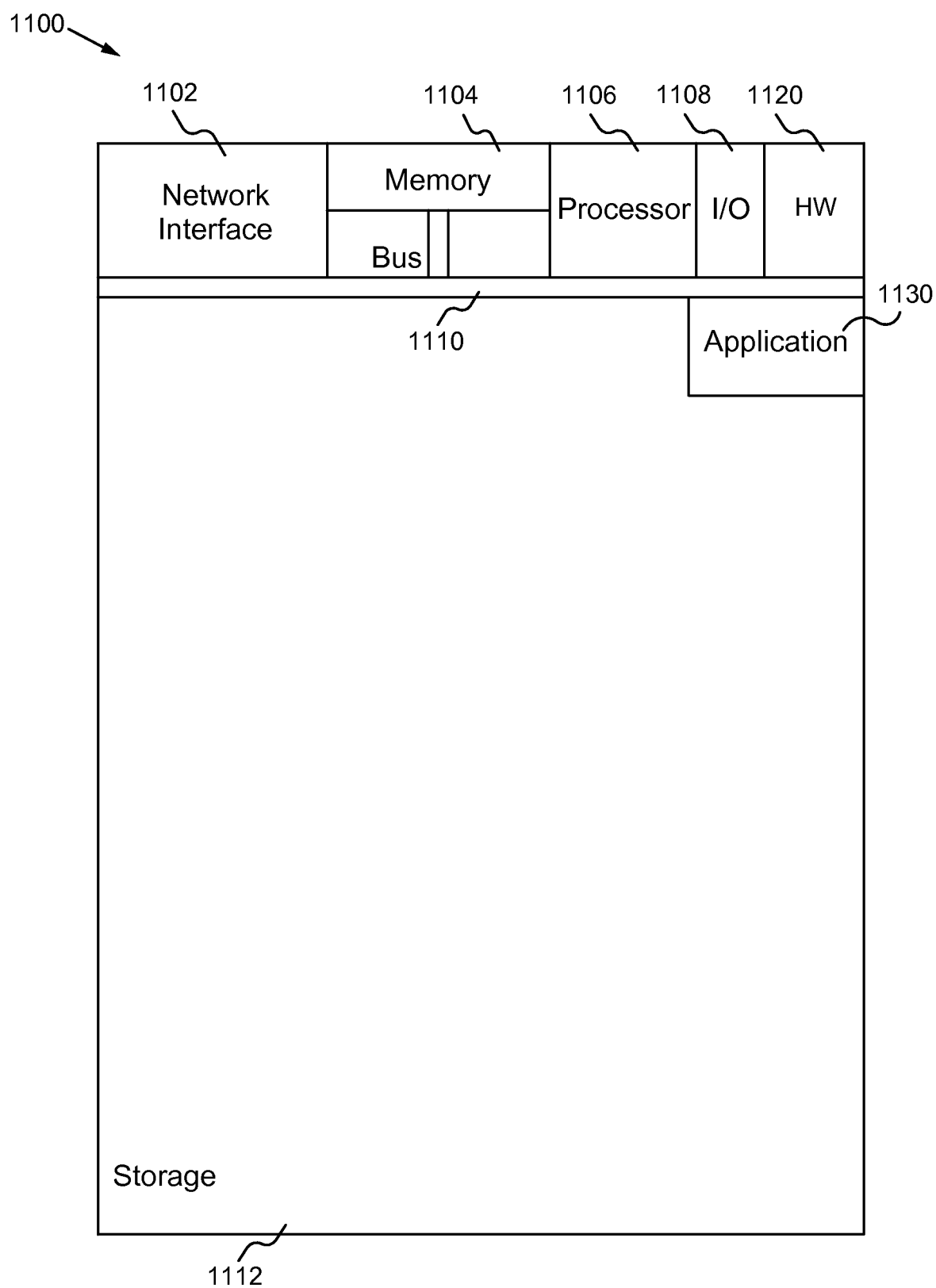
FIG. 11 illustrates a block diagram of an exemplary computing device configured to implement the buffer management methods according to some embodiments.

FIG. 11 illustrates a block diagram of an exemplary computing device configured to implement the buffer management methods according to some embodiments. The computing device 1100 is able to be used to acquire, store, compute, process, communicate and/or display information such as images and videos. In general, a hardware structure suitable for implementing the computing device 1100 includes a network interface 1102, a memory 1104, a processor 1106, I/O device(s) 1108, a bus 1110 and a storage device 1112. The choice of processor is not critical as long as a suitable processor with sufficient speed is chosen. The memory 1104 is able to be any conventional computer memory known in the art. The storage device 1112 is able to include a hard drive, CDROM, CDRW, DVD, DVDRW, High Definition disc/drive, ultra-HD drive, flash memory card or any other storage device. The computing device 1100 is able to include one or more network interfaces 1102. An example of a network interface includes a network card connected to an Ethernet or other type of LAN. The I/O device(s) 1108 are able to include one or more of the following: keyboard, mouse, monitor, screen, printer, modem, touchscreen, button interface and other devices. Buffer management application(s) 1130 used to perform the buffer management methods are likely to be stored in the storage device 1112 and memory 1104 and processed as applications are typically processed. More or fewer components shown in FIG. 11 are able to be included in the computing device 1100. In some embodiments, buffer management hardware 1120 is included. Although the computing device 1100 in FIG. 11 includes applications 1130 and hardware 1120 for the buffer management methods, the buffer management methods are able to be implemented on a computing device in hardware, firmware, software or any combination thereof. For example, in some embodiments, the buffer management applications 1130 are programmed in a memory and executed using a processor. In another example, in some embodiments, the buffer management hardware 1120 is programmed hardware logic including gates specifically designed to implement the buffer management methods.

In some embodiments, the buffer management application(s) 1130 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, smart jewelry (e.g., smart watch) or any other suitable computing device.

To utilize the buffer management methods, a device such as a digital video camera is used to acquire a video. The buffer management methods are automatically implemented during or after acquiring a video. The buffer management methods are able to be implemented automatically without user involvement.

In operation, the buffer management methods are implemented to improve efficiency of processing videos. The methods simplify the complexity of STD buffer management for HEVC and make is easy to implement HEVC in deployed AVC/MPEG-2 networks (as legacy re-multiplexers are able to be used for re-purposing HEVC content). The buffers for base and enhancement layers are also able to be managed independently before re-assembly and this simplifies the STD model. Re-assembly is still implemented before decoding an enhanced HEVC video stream.

Some Embodiments of Layer Based HRD Buffer Management for Scalable Hevc

1. A method programmed in a non-transitory memory of a device comprising:
   a. acquiring a video; and
   b. transmitting a bitstream of the video including signaling a maximum bit rate, average bit rate and maximum coded picture buffer size allocated for each layer in the bitstream.
2. The method of clause 1 further comprising implementing an extension and parameters that are configured to be defined as whole-sequence level or sub-stream level.
3. The method of clause 2 further comprising managing a system buffer for each layer independently without having to re-assemble lower layers.
4. The method of clause 1 further comprising managing buffers for base and enhancement layers of the video before re-assembly.
5. The method of clause 1 further comprising implementing a multilayer decoder.
6. The method of clause 1 further comprising associating buffering period and picture timing supplemental enhancement information messages with each layer of the video.
7. The method of clause 1 further comprising utilizing a same picture timing supplemental enhancement information message for all layers of the video for synchronization of removal times within a layer set, and utilizing different buffering period supplemental enhancement information messages for each layer of the video.
8. The method of clause 1 wherein the device is selected from the group consisting of a personal computer, a laptop computer, a computer workstation, a server, a mainframe computer, a handheld computer, a personal digital assistant, a cellular/mobile telephone, a smart phone, a smart appliance, a gaming console, a digital camera, a digital camcorder, a camera phone, an portable music player, a tablet computer, a video player, a DVD writer/player, a high definition video writer/player, a television and a home entertainment system.
9. A system programmed in a non-transitory memory of a camera device comprising:
   a. a sensor configured for acquiring a video; and
   b. a transmitting component configured for transmitting a bitstream of the video including signaling a maximum bit rate, average bit rate and maximum coded picture buffer size allocated for each layer in the bitstream.
10. The system of clause 9 wherein the transmitting component is further configured for implementing an extension and parameters that are configured to be defined as whole-sequence level or sub-stream level.
11. The system of clause 10 wherein the transmitting component is further configured for managing a system buffer for each layer independently without having to re-assemble lower layers.
12. The system of clause 9 wherein the transmitting component is further configured for managing buffers for base and enhancement layers of the video before re-assembly.
13. The system of clause 9 wherein the transmitting component is further configured for implementing a multilayer decoder.
14. The system of clause 9 wherein the transmitting component is further configured for associating buffering period and picture timing supplemental enhancement information messages with each layer of the video.
15. The system of clause 9 wherein the transmitting component is further configured for utilizing a same picture timing supplemental enhancement information message for all layers of the video for synchronization of removal times within a layer set, and utilizing different buffering period supplemental enhancement information messages for each layer of the video.
16. An apparatus comprising:
   a. a sensor configured for acquiring a video;
   b. a non-transitory memory for storing an application, the application for:
      transmitting a bitstream of the video including signaling a maximum bit rate, average bit rate and maximum coded picture buffer size allocated for each layer in the bitstream; and
   c. a processing component coupled to the memory, the processing component configured for processing the application.
17. The apparatus of clause 16 wherein the application is further configured for implementing an extension and parameters that are configured to be defined as whole-sequence level or sub-stream level.
18. The apparatus of clause 17 wherein the application is further configured for managing a system buffer for each layer independently without having to re-assemble lower layers.
19. The apparatus of clause 16 wherein the application is further configured for managing buffers for base and enhancement layers of the video before re-assembly.
20. The apparatus of clause 16 wherein the application is further configured for implementing a multilayer decoder.
21. The apparatus of clause 16 wherein the application is further configured for associating buffering period and picture timing supplemental enhancement information messages with each layer of the video.
22. The apparatus of clause 16 wherein the application is further configured for utilizing a same picture timing supplemental enhancement information message for all layers of the video for synchronization of removal times within a layer set, and utilizing different buffering period supplemental enhancement information messages for each layer of the video.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method, comprising:
   in a decoder system:
      accessing a video bitstream that includes a base layer bitstream and a combined base and enhancement layer bitstream,
         wherein the base layer bitstream and the combined base and enhancement layer bitstream include hypothetical reference decoder parameters for each layer, and
         wherein the hypothetical reference decoder parameters comprise at least one of a bit rate or a Coded Picture Buffer (CPB) size;
      decoding the video bitstream,
         wherein a first buffer for the base layer bitstream and a second buffer for the combined base and enhancement layer bitstream are managed independently based on respective hypothetical reference decoder parameters;

utilizing a same picture timing supplemental enhancement information message for each of the base layer bitstream and the combined base and enhancement layer bitstream, for synchronization of removal times such that a number of bits that is present in the video bitstream are counted to decode a particular set of bits of the video bitstream; and utilizing a first buffering period supplemental enhancement information message for the base layer bitstream.

2. The method of claim 1, wherein the base layer bitstream utilizes a different profile than the combined base and enhancement layer bitstream.

3. The method of claim 1, wherein the video bitstream indicates at least one of the bit rate or the coded picture buffer size allocated for each of the base layer bitstream and the combined base and enhancement layer bitstream.

4. The method of claim 1, further comprising associating the first buffering period supplemental enhancement information message and the same picture timing supplemental enhancement information message with each of the base layer bitstream and the combined base and enhancement layer bitstream.

5. The method of claim 1, further comprising:
utilizing a second buffering period supplemental enhancement information message for the combined base and enhancement layer bitstream,
wherein the first buffering period supplemental enhancement information message is different from the second buffering period supplemental enhancement information message.

6. A decoder system, comprising:
at least one processor configured to:
access a video bitstream that includes a base layer bitstream and a combined base and enhancement layer bitstream,
wherein the base layer bitstream and the combined base and enhancement layer bitstream include hypothetical reference decoder parameters for each layer, and
wherein the hypothetical reference decoder parameters comprise at least one of a bit rate or a Coded Picture Buffer (CPB) size;

a decoder configured to decode the video bitstream,
wherein a first buffer for the base layer bitstream and a second buffer for the combined base and enhancement layer bitstream are managed independently based on respective hypothetical reference decoder parameters;
utilize a same picture timing supplemental enhancement information message for each of the base layer bitstream and the combined base and enhancement layer bitstream, for synchronization of removal times such that a number of bits that is present in the video bitstream are counted to decode a particular set of bits of the video bitstream; and
utilize a first buffering period supplemental enhancement information message for the base layer bitstream.

7. The decoder system of claim 6, wherein the base layer bitstream utilizes a different profile than the combined base and enhancement layer bitstream.

8. The decoder system of claim 6, wherein video bitstream indicates at least one of the bit rate or the coded picture buffer size allocated for each of the base layer bitstream and the combined base and enhancement layer bitstream.

9. The decoder system of claim 6,
wherein the first buffering period supplemental enhancement information message and the same picture timing supplemental enhancement information message are associated with each of the base layer bitstream and the combined base and enhancement layer bitstream.

10. The decoder system of claim 6,
wherein a second buffering period supplemental enhancement information message is utilized for the combined base and enhancement layer bitstream, and
wherein the first buffering period supplemental enhancement information message is different from the second buffering period supplemental enhancement information message.

11. The decoder system of claim 6, wherein the decoder comprises a bitstream demultiplexer, at least two Bitstream Partition Buffers (BPB), at least two instantaneous decoders, a Decoding Picture Buffer (DPB), and output cropping circuitry.

12. The decoder system of claim 6, wherein the hypothetical reference decoder parameters of the base layer bitstream are different from the hypothetical reference decoder parameters of the combined base and enhancement layer bitstream.

* * * * *